United States Patent
Hosseini et al.

(10) Patent No.: US 10,659,257 B2
(45) Date of Patent: May 19, 2020

(54) LOW LATENCY MULTIPLEXING OPERATIONS

(71) Applicant: QUALCOMM Incorporated, San Diego, CA (US)

(72) Inventors: Seyedkianoush Hosseini, San Diego, CA (US); Amir Farajidana, Sunnyvale, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 16/169,471

(22) Filed: Oct. 24, 2018

(65) Prior Publication Data

US 2019/0132157 A1 May 2, 2019

Related U.S. Application Data

(60) Provisional application No. 62/579,879, filed on Oct. 31, 2017, provisional application No. 62/631,474, filed on Feb. 15, 2018.

(51) Int. Cl.

| | |
|---|---|
| *H04W 4/00* | (2018.01) |
| *H04L 25/02* | (2006.01) |
| *H04L 5/00* | (2006.01) |
| *H04W 72/14* | (2009.01) |
| *H04J 11/00* | (2006.01) |

(Continued)

(52) U.S. Cl.
CPC ...... *H04L 25/0204* (2013.01); *H04J 11/0069* (2013.01); *H04L 1/00* (2013.01);
(Continued)

(58) Field of Classification Search
CPC .... H04W 72/1289; H04W 72/14; H04L 1/00; H04L 25/0224
See application file for complete search history.

(56) References Cited

U.S. PATENT DOCUMENTS

| | | |
|---|---|---|
| 2013/0201975 A1 | 8/2013 | Chen et al. |
| 2016/0073366 A1 | 3/2016 | Ng et al. |

OTHER PUBLICATIONS

Qualcomm Incorporated: "Downlink Control Channel Design for Shortened TTI", 3GPP Draft, R1-1611638 DL Control Channel Design for Shortened TTI, 3rd Generation Partnership Project (3GPP), Mobile Competence Centre, 650, Route Des Lucioles, F-06921 Sophia-Antipolis Cedex, FRA vol. RAN WG 1, No. Reno, Nevada, USA, Nov. 14, 2016-Nov. 18, 2016, Nov. 13, 2016 (Nov. 13, 2016), XP051175611, 9 Pages, Retrieved from the Internet: URL:http://www.3gpp.org/ftp/Meetings_3GPP_SYNC/RAN1/ Docs/ [retrieved on Nov. 13, 2016].

(Continued)

*Primary Examiner* — Bo Hui A Zhu
(74) *Attorney, Agent, or Firm* — Holland & Hart LLP

(57) ABSTRACT

A user equipment (UE) may receive, during a first transmission time interval (TTI), one or more broadcasts from a base station over a first frequency range. The UE may receive, during the first TTI, a reference signal over a second frequency range that is disjoint from the first frequency range. The UE may receive, during a subsequent TTI, a downlink grant from the base station scheduling a downlink data transmission over at least portions of both the first frequency range and the second frequency range, wherein the downlink grant comprises a reference signal sharing indication. The UE may obtain a channel estimate for the second frequency range of the subsequent TTI based at least in part on the reference signal and may refrain from applying the channel estimate to the first frequency range in the subsequent TTI.

30 Claims, 21 Drawing Sheets

(51) Int. Cl.
*H04L 1/00* (2006.01)
*H04W 72/12* (2009.01)

(52) U.S. Cl.
CPC .......... *H04L 5/0044* (2013.01); *H04L 5/0048* (2013.01); *H04L 5/0087* (2013.01); *H04L 5/0091* (2013.01); *H04L 25/0262* (2013.01); *H04W 72/1289* (2013.01); *H04W 72/14* (2013.01); *H04L 5/0023* (2013.01); *H04L 5/0064* (2013.01); *H04L 25/0202* (2013.01)

(56) References Cited

OTHER PUBLICATIONS

LG Electronics: "DRS Design in LAA," 3GPP Draft; R1-155387 DRS Design, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015, Sep. 26, 2015, XP051021560, 11 pages, Retrieved from the Internet: URL: http://www.3gpp.org/ftp/tsg_ran/WG1_RL1/TSGR1_82b/Docs/ [retrieved on Sep. 26, 2015].

Partial International Search Report—PCT/US2018/057563—ISA/EPO—dated Feb. 1, 2019.

Qualcomm Incorporated: "Shortened PDCCH and Data Multiplexing", 3GPP Draft; R1-1704988 Shortened PDCCH and Data Multiplexing, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), 6 pages, XP051243119, Retrieved from the Internet: URL: http://www.3gpp.org/ftp/Meetings_3GPP_SYNC/RAN1/Docs/ [retrieved on Apr. 2, 2017].

International Search Report and Written Opinion—PCT/US2018/057563—ISA/EPO—dated Apr. 3, 2019.

LOW LATENCY MULTIPLEXING OPERATIONS

CROSS REFERENCES

The present Application for Patent claims the benefit of U.S. Provisional Patent Application No. 62/579,879 by HOSSEINI, et al., entitled "LOW LATENCY MULTIPLEXING OPERATIONS," filed Oct. 31, 2017 and to U.S. Provisional Patent Application No. 62/631,474 by HOSSEINI, et al., entitled "LOW LATENCY MULTIPLEXING OPERATIONS", filed Feb. 15, 2018, assigned to the assignee hereof, and expressly incorporated herein.

BACKGROUND

The following relates generally to wireless communication, and more specifically to low latency multiplexing operations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems (e.g., NR systems), a base station may communicate with a UE on a carrier using shortened transmission time intervals (sTTIs). For example, the base station may allocate transmission resources of an sTTI to carry a shortened physical downlink shared channel (sPDSCH). In some cases, the allocated resources may collide with one or more broadcast transmissions from the base station. Examples of such broadcast transmissions include primary synchronization signal (PSS), secondary synchronization signal (SSS), and physical broadcast channel (PBCH). Each of these transmissions may occur periodically and be associated with a set of frequency resources (e.g., 72 subcarriers or six resource blocks (RBs)) that are centrally located within a system bandwidth. By way of example, PBCH may occupy the first four symbols of a second slot within each radio frame; PSS may be located over the last symbol of the first slot of the first and sixth subframes within each radio frame; and SSS may be transmitted with the same periodicity as PSS, occupying the symbol preceding the PSS in the first and sixth subframes. When transmission resources allocated for sPDSCH overlap at least partially with symbols allocated for broadcast transmissions, collisions may occur. Such collisions may decrease throughput or otherwise negatively impact the wireless system. The base station may also transmit reference signals to the UE during the sTTI, and the UE may use the reference signals to perform channel estimation to correctly demodulate the data in the sTTI. Efficient techniques for transmitting reference signals within an sTTI may be desirable to reduce overhead in a wireless communications system.

SUMMARY

The described techniques relate to improved methods, systems, devices, or apparatuses that support low latency multiplexing operations. Generally, the described techniques provide for multiplexing low latency information with broadcast transmissions. A downlink data transmission (e.g., which may include low latency information or non-latency-sensitive information) may be multiplexed with broadcast transmissions during one or more transmission intervals. In some cases, multiplexing the broadcast transmission(s) with the downlink data transmission may be based on a reference signal pattern for use in receiving the downlink data transmission. For example, the reference signal pattern may indicate the location of a reference signal that may be used to perform channel estimation for a group of transmission resources (e.g., which may span multiple symbols, multiple shortened transmission time intervals (sTTIs), multiple slots, etc.). Additionally or alternatively, multiplexing the downlink data transmission with the one or more broadcasts may include determining whether resource blocks carrying the one or more broadcasts may carry the downlink data transmission. For example, such a determination may be based on the type of broadcast, a configuration of the subframe, or other such information.

A method of wireless communication is described. The method may include determining whether one or more broadcast signals over a first frequency range and a reference signal over a second frequency range are both received within a first TTI; receiving, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI; and determining whether to monitor for the scheduled downlink data transmission based on determining whether the one or more broadcast signals and the reference signal are received within the first TTI.

An apparatus for wireless communication is described. The apparatus may include a processor, memory in electronic communication with the processor, and instructions stored in the memory. The instructions may be executable by the processor to cause the apparatus to determine whether one or more broadcast signals over a first frequency range and a reference signal over a second frequency range are both received within a first TTI; receive, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI; and determine whether to monitor for the scheduled downlink data transmission based on determining whether the one or more broadcast signals and the reference signal are received within the first TTI.

Another apparatus for wireless communication is described. The apparatus may include means for determining whether one or more broadcast signals over a first frequency range and a reference signal over a second frequency range are both received within a first TTI; receiving, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI; and determining whether to monitor for the scheduled downlink data transmission based on determining whether the one or more broadcast signals and the reference signal are received within the first TTI.

A non-transitory computer-readable medium storing code for wireless communication is described. The code may include instructions executable by a processor to determine whether one or more broadcast signals over a first frequency range and a reference signal over a second frequency range are both received within a first TTI; receive, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI; and determine whether to monitor for the scheduled downlink data transmission based on determining whether the one or more broadcast signals and the reference signal are received within the first TTI.

In some examples of the method, apparatuses, and non-transitory computer-readable medium described herein, determining whether to monitor for the scheduled downlink data transmission further may include operations, features, means, or instructions for determining to monitor for the scheduled downlink data transmission rate-matched around the first frequency range in the subsequent TTI based on the one or more broadcast signals and the reference signal both being received within the first TTI.

In some examples of the method, apparatuses, and non-transitory computer-readable medium described herein, determining whether to monitor for the scheduled downlink data transmission further may include operations, features, means, or instructions for determining to decode the scheduled downlink data transmission without rate-matching based on the one or more broadcast signals and the reference signal not being received within the same TTI.

In some examples of the method, apparatuses, and non-transitory computer-readable medium described herein, the second frequency range may be disjoint from the first frequency range.

Some examples of the method, apparatuses, and non-transitory computer-readable medium described herein may further include operations, features, means, or instructions for obtaining, in accordance with the indication, a channel estimate for the second frequency range in the subsequent TTI based on the reference signal and refraining from applying the channel estimate to the first frequency range in the subsequent TTI.

Some examples of the method, apparatuses, and non-transitory computer-readable medium described herein may further include operations, features, means, or instructions for receiving the scheduled downlink data transmission during the subsequent TTI based on the channel estimate.

In some examples of the method, apparatuses, and non-transitory computer-readable medium described herein, receiving the scheduled downlink data transmission may include operations, features, means, or instructions for receiving the scheduled downlink data transmission rate-matched around the first frequency range in the subsequent TTI.

In some examples of the method, apparatuses, and non-transitory computer-readable medium described herein, the one or more broadcast signals may be transmitted within a subframe whose duration may be longer than and overlaps with the first TTI and the subsequent TTI.

In some examples of the method, apparatuses, and non-transitory computer-readable medium described herein, the first TTI and the subsequent TTI include temporally adjacent TTIs.

In some examples of the method, apparatuses, and non-transitory computer-readable medium described herein, the one or more broadcast signals includes a PSS, a SSS, a physical broadcast channel (PBCH), or a combination thereof.

Some examples of the method, apparatuses, and non-transitory computer-readable medium described herein may further include operations, features, means, or instructions for receiving the one or more broadcast signals and a downlink data transmission in the first TTI, where at least one of the one or more broadcast signals and the downlink data transmission overlap in at least one RB, and where the downlink data transmission includes 1-slot PDSCH.

Some examples of the method, apparatuses, and non-transitory computer-readable medium described herein may further include operations, features, means, or instructions for receiving the one or more broadcast signals and the reference signal in the first TTI, where at least one of the one or more broadcast signals and the reference signal overlap in at least one RB.

Some examples of the method, apparatuses, and non-transitory computer-readable medium described herein may further include operations, features, means, or instructions for receiving the scheduled downlink data transmission in only the second frequency range of the subsequent TTI based on the at least one of the one or more broadcast signals and the reference signal overlapping in the at least one RB, where the scheduled downlink transmission may include an RB distinct from the at least one RB.

In some examples of the method, apparatuses, and non-transitory computer-readable medium described herein, the scheduled downlink data transmission includes a 1-slot PDSCH and the one or more broadcast signals include a PBCH.

In some examples of the method, apparatuses, and non-transitory computer-readable medium described herein, the one or more broadcast signals include at least one of a PSS, a SSS, a PBCH, or combinations thereof.

In some examples of the method, apparatuses, and non-transitory computer-readable medium described herein, the single RB may be available within a precoding resource group (PRG).

Some examples of the method, apparatuses, and non-transitory computer-readable medium described herein may further include operations, features, means, or instructions for determining that only a single RB may be available to receive the scheduled downlink data transmission based on the overlap of the at least one of the one or more broadcast signals and the reference signal in the at least one RB in the first TTI and refraining from monitoring for the scheduled downlink data transmission during the subsequent TTI based on the scheduled downlink data transmission being a 1-slot PDSCH and based on the one or more broadcast signals and the reference signal both being received within the first TTI.

A method of wireless communication at a base station is described. The method may include transmitting, during a first TTI, one or more broadcast signals to a UE over a first frequency range; transmitting, during the first TTI, a reference signal over a second frequency range; and transmitting, during a subsequent TTI, a downlink grant to the UE scheduling a downlink data transmission over at least portions of both the first frequency range and the second frequency range, where the downlink grant includes an indication of whether the UE is to apply the reference signal to the subsequent TTI.

An apparatus for wireless communication at a base station is described. The apparatus may include a processor, memory in electronic communication with the processor, and instructions stored in the memory. The instructions may be executable by the processor to cause the apparatus to transmit, during a first TTI, one or more broadcast signals to a UE over a first frequency range; transmit, during the first TTI, a reference signal over a second frequency range; and transmit, during a subsequent TTI, a downlink grant to the UE scheduling a downlink data transmission over at least portions of both the first frequency range and the second frequency range, where the downlink grant includes an indication of whether the UE is to apply the reference signal to the subsequent TTI.

Another apparatus for wireless communication at a base station is described. The apparatus may include means for transmitting, during a first TTI, one or more broadcast signals to a UE over a first frequency range; transmitting, during the first TTI, a reference signal over a second frequency range; and transmitting, during a subsequent TTI, a downlink grant to the UE scheduling a downlink data transmission over at least portions of both the first frequency range and the second frequency range, where the downlink grant includes an indication of whether the UE is to apply the reference signal to the subsequent TTI.

A non-transitory computer-readable medium storing code for wireless communication at a base station is described. The code may include instructions executable by a processor to transmit, during a first TTI, one or more broadcast signals to a UE over a first frequency range; transmit, during the first TTI, a reference signal over a second frequency range; and transmit, during a subsequent TTI, a downlink grant to the UE scheduling a downlink data transmission over at least portions of both the first frequency range and the second frequency range, where the downlink grant includes an indication of whether the UE is to apply the reference signal to the subsequent TTI.

Some examples of the method, apparatuses, and non-transitory computer-readable medium described herein may further include operations, features, means, or instructions for transmitting the scheduled downlink data transmission over the second frequency range during the subsequent TTI.

In some examples of the method, apparatuses, and non-transitory computer-readable medium described herein, transmitting the scheduled downlink data transmission may include operations, features, means, or instructions for transmitting the scheduled downlink data transmission rate-matched around the first frequency range in the subsequent TTI.

In some examples of the method, apparatuses, and non-transitory computer-readable medium described herein, the one or more broadcast signals may be transmitted within a subframe whose duration may be longer than and overlaps with the first TTI and the subsequent TTI.

In some examples of the method, apparatuses, and non-transitory computer-readable medium described herein, the first TTI and the subsequent TTI include temporally adjacent TTIs.

In some examples of the method, apparatuses, and non-transitory computer-readable medium described herein, the one or more broadcast signals include a PSS, a SSS, a PBCH, or a combination thereof.

Some examples of the method, apparatuses, and non-transitory computer-readable medium described herein may further include operations, features, means, or instructions for transmitting the scheduled downlink data transmission in only the second frequency range of the subsequent TTI based on the at least one of the one or more broadcast signals and the reference signal overlapping in at least one RB, where the scheduled downlink transmission may include an RB distinct from the at least one RB.

In some examples of the method, apparatuses, and non-transitory computer-readable medium described herein, the scheduled downlink data transmission includes a 1-slot PDSCH and the one or more broadcast signals include a PBCH.

Some examples of the method, apparatuses, and non-transitory computer-readable medium described herein may further include operations, features, means, or instructions for determining that only a single RB may be available to transmit the scheduled downlink data transmission and refraining from transmitting the scheduled downlink data transmission during the subsequent TTI based on the scheduled downlink data transmission being a 1-slot PDSCH and based on the one or more broadcast signals and the reference signal both being transmitted within the first TTI.

In some examples of the method, apparatuses, and non-transitory computer-readable medium described herein, the one or more broadcast signals include at least one of a PSS, a SSS, a PBCH, or combinations thereof.

In some examples of the method, apparatuses, and non-transitory computer-readable medium described herein, the single RB may be available within a precoding resource group (PRG).

DETAILED DESCRIPTION

Some wireless communications systems may support communication between a base station and a user equipment (UE) on a carrier using shortened transmission time intervals (sTTIs). The sTTIs may include transmission resources which are allocated to carry shortened physical downlink shared channel (sPDSCH) transmissions. In some cases, the transmission resources allocated for sPDSCH may overlap at least partially with one or more broadcast transmissions such as primary synchronization signal (PSS), secondary synchronization signal (SSS), or physical broadcast channel (PBCH). For example, these broadcast transmissions may be transmitted periodically, and in at least some periods sPDSCH reception may be compromised by a collision between resources allocated for the broadcast transmission and resources allocated for sPDSCH. As an example, the broadcast transmissions may puncture transmission of reference signals used to perform channel estimation for sPDSCH (e.g., demodulation reference signal (DMRS)). Alternatively, the sPDSCH (e.g., which may include or otherwise be concurrently transmitted with DMRS) may be rate matched around the broadcast transmissions. Accordingly, sPDSCH resources covered by the punctured reference signals (e.g., or resources around which sPDSCH is rate-matched) may suffer from inadequate channel estimation, which may impact decoding of a received signal. Improved techniques are discussed herein for enabling coexistence of sPDSCH with broadcast transmissions.

Aspects of the disclosure are initially described in the context of a wireless communications system. Examples of processes and signaling exchanges that support low latency multiplexing operations are then described. Aspects of the disclosure are further illustrated by and described with reference to apparatus diagrams, system diagrams, and flowcharts that relate to low latency multiplexing operations.

Figure 1:
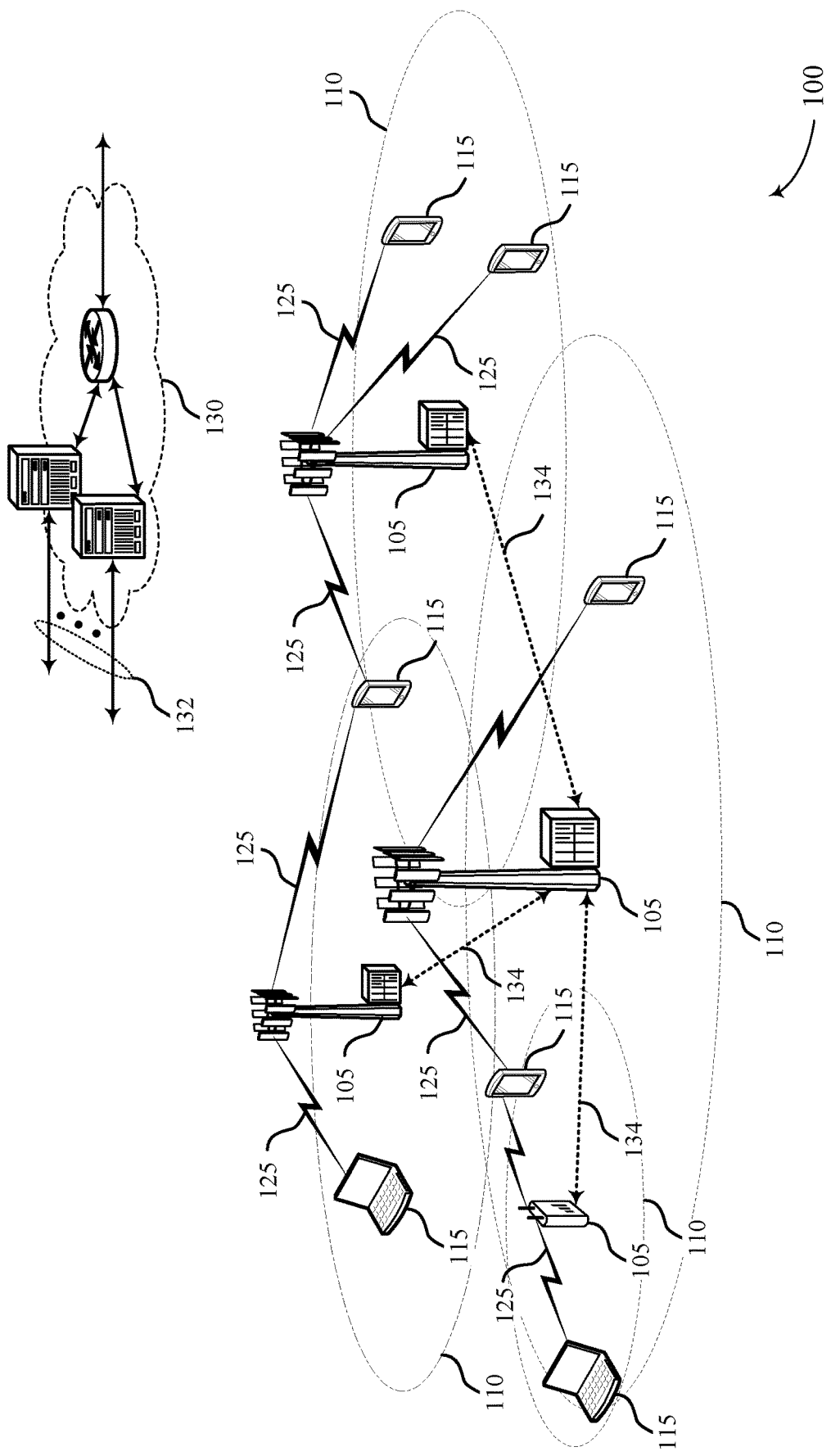
FIG. 1 illustrates an example of wireless communications system that supports low latency multiplexing operations in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE network, an LTE-A network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at multiple antenna elements of an antenna array, or by processing received signals according to different receive beamforming weight sets applied to signals received at multiple antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of sTTIs or in selected component carriers using sTTIs). Examples of sTTI durations include a one-slot sTTI, a two-symbol sTTI, a three-symbol sTTI, etc.

A base station 105 may transmit system information, which UEs 115 may use to access a wireless network (e.g., through the base station 105). The UEs 115 may also receive timing information to synchronize with the base station 105. Synchronization (e.g., for cell acquisition) may be performed using synchronization signals or channels transmitted by a synchronization source (e.g., the base station 105). Synchronization signals may include PSS or SSS. The UEs 115 attempting to access a wireless network may perform an initial cell search by detecting a PSS from the base station 105. The PSS may enable synchronization of slot timing or symbol timing. The UEs 115 may then receive an SSS.

The SSS may enable radio frame synchronization, and may provide a cell ID value, which may be combined with the physical layer identity value to form the physical cell identifier (PCID), which identifies the cell. The SSS may also enable detection of a duplexing mode (e.g., TDD or FDD). An SSS may be used to acquire other broadcast information (e.g., system bandwidth). In some cases, the base station 105 may provide the other broadcast information for the UEs 115 in the PBCH. As such, the PBCH may be used to acquire additional broadcast information needed for acquisition (e.g., system bandwidth, radio frame index/number). In some examples, the PBCH may be multiplexed on a carrier according to various techniques. A PBCH and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a PBCH may be distributed between different control regions in a cascaded manner (e.g., between a common control region or common search space and one or more UE-specific control regions or UE-specific search spaces).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As described herein, a base station 105 in wireless communications system 100 may support efficient techniques for transmitting reference signals to a UE 115 with limited overhead. Further, a UE 115 within wireless communications system 100 may support efficient techniques for performing channel estimation using reference signals received in multiple sTTIs to improve the accuracy and reliability of a channel estimate used to demodulate data in an sTTI. In some aspects, a base station 105 may transmit reference signals in some of the sTTIs used for downlink communications with a UE 115, and the UE 115 may be configured to use the reference signals in these sTTIs to perform channel estimation for demodulating data in these sTTIs and others. Additionally or alternatively, using the techniques described herein, the UE 115 may in some cases be configured to perform channel estimation for demodulating data in an sTTI using reference signals received in the sTTI in combination with reference signals received in previous sTTIs.

Figure 2:
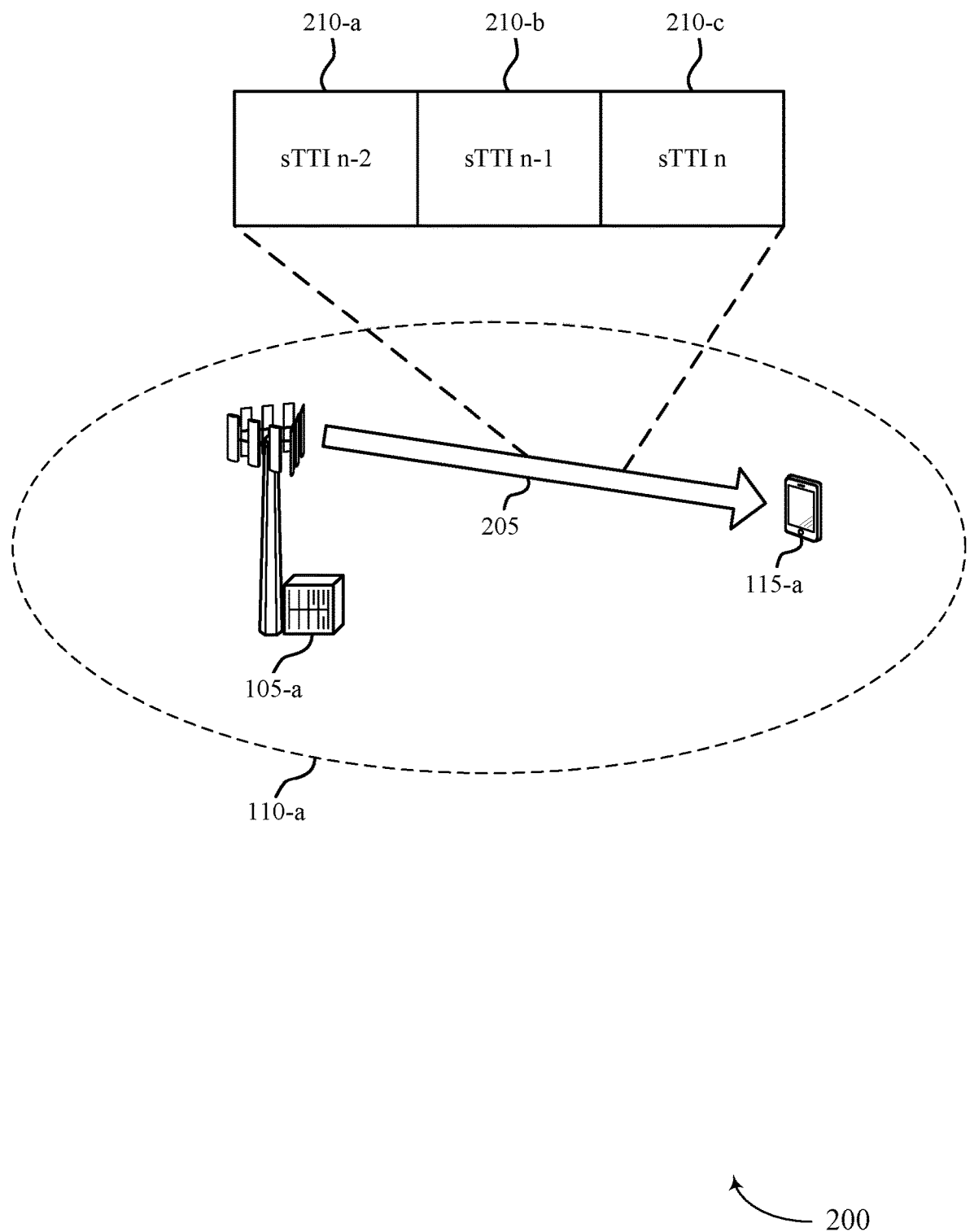
FIG. 2 illustrates an example of a wireless communications system that supports low latency multiplexing operations in accordance with aspects of the present disclosure.

FIG. 2 illustrates an example of a wireless communications system 200 that supports low latency multiplexing operations in accordance with various aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. Wireless communications system 200 may implement aspects of wireless communications system 100. For example, base station 105-a may communicate with UE 115-a during sTTIs 210 on resources of the carrier 205.

Base station 105-a may transmit control information to UE 115-a in a shortened physical downlink control channel (sPDCCH) in an sTTI 210, and base station 105-a may transmit data to UE 115-a in an sPDSCH in the sTTI 210. In some cases, base station 105-a may also transmit DMRS to UE 115-a in the sTTI 210 to allow UE 115-a to perform channel estimation for demodulating the data in the sTTI 210. Using the techniques described herein, base station 105-a may transmit the DMRS in some of the sTTIs 210 used for downlink communications with UE 115-a, and UE 115-a may use these DMRS to perform channel estimation for demodulating data in these sTTIs 210 and other sTTIs 210. In some cases, UE 115-a may receive an indication to use DMRS received in a current sTTI 210, DMRS received in an sTTI 210 immediately preceding the current sTTI 210, or both to perform channel estimation for demodulating data received in the current sTTI 210. That is, UE 115-a may be configured with a DMRS sharing window size of two. In one example, UE 115-a may receive DMRS in sTTI 210-b, and UE 115-a may not receive DMRS in sTTI 210-c. In this example, UE 115-a may use the DMRS received in sTTI 210-b to perform channel estimation for demodulating data received in sTTI 210-c. In another example, UE 115-a may receive DMRS in sTTI 210-b and sTTI 210-c. In this example, UE 115-a may perform channel estimation for demodulating data received in sTTI 210-c using the DMRS received in sTTI 210-c in combination with the DMRS received in sTTI 210-b.

Figure 3:
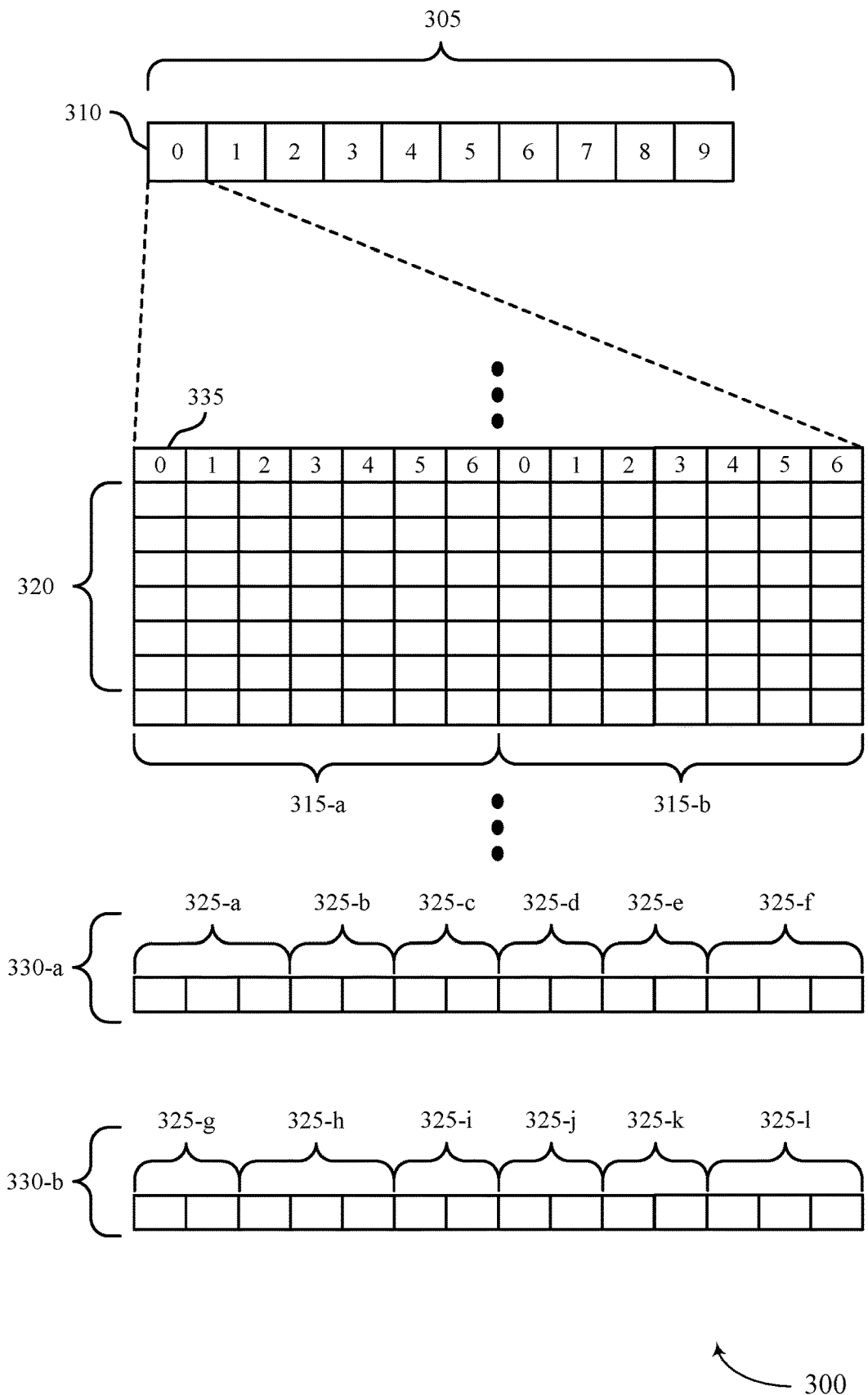
FIG. 3 illustrates an example of a resource configuration that supports low latency multiplexing operations in accordance with aspects of the present disclosure.

FIG. 3 illustrates an example of a resource configuration 300 that supports low latency multiplexing operations in accordance with various aspects of the present disclosure. Resource configuration 300 may be applicable to a UE 115 or a base station 105 as described herein and may implement aspects of wireless communications system 100 and wireless communications system 200. Resource configuration 300 illustrates a radio frame 305 including ten subframes 310 (numbered '0' through '9'). As discussed above, each subframe 310 may contain two slots 315-a and 315-b, each of which spans seven symbol periods in the present example. Additionally, each subframe 310 may be divided in frequency into subcarriers. For the sake of explanation, resource configuration 300 illustrates an organization of blocks 335, where each block 335 spans a single symbol period in time and twelve subcarriers in frequency. Accordingly, the seven blocks 335 in the first row of slot 315-a may be referred to as a RB.

In some wireless systems, PBCH may occupy a central set of six RBs 320 (72 subcarriers) over the first four symbols of slot 315-b of the first subframe 310 (subframe 0) of each radio frame 305. Similarly, PSS may be located over the last symbol of slot 315-a of the first subframe 310 (subframe 0) of each radio frame 305 and the last symbol of the first slot of the sixth subframe 310 (subframe 5) of each radio frame 305. SSS may be sent with the same periodicity as PSS but may occupy the symbol preceding the PSS. Various resource patterns 330 may be realized in a given subframe 310 to support sTTI communications (e.g., over sPDSCH). Each resource pattern 330 includes sTTIs 325. For example, both resource pattern 330-a and resource pattern 330-b contain four two-symbol sTTIs 325 (e.g., sTTI 325-b, sTTI 325-c, sTTI 325-d, and sTTI 325-e for resource pattern 330-a and sTTI 325-g, sTTI 325-i, sTTI 325-j, and sTTI 325-k for resource pattern 330-b) and two three-symbol sTTIs 325 (e.g., sTTI 325-a and sTTI 325-f for resource pattern 330-a and sTTI 325-h and sTTI 325-1 for resource pattern 330-b). In this case, both resource pattern 330-a and resource pattern 330-b span fourteen blocks 335, the total length of a row of slot 315-a and slot 315-b in the present example. In some cases, the first sTTI 325 of each resource pattern 330 (i.e., sTTI 325-a for resource pattern 330-a and sTTI 325-g for resource pattern 330-b) may contain control information. In some cases, a subset of sTTI 325-a (e.g., only the first symbol period) may contain the control information while the remaining two symbol periods may be allocated for data transmissions.

Based on the periodicities of the broadcast transmissions outlined above, collision patterns may be observed for a subset of the sTTIs 325. For example, the PSS and SSS transmission may completely overlap with sPDSCH allocations in sTTI 325-c or sTTI 325-i (in subframes 310 which contain PSS and SSS). Similarly, PBCH transmission may completely overlap with sPDSCH allocations in sTTI 325-d and sTTI 325-e in resource pattern 330-a or sTTI 325-j and sTTI 325-k in resource pattern 330-b (e.g., in the first subframe 310 of each radio frame 305). In cases in which a two-symbol sPDSCH allocation collides with a broadcast transmission, broadcast transmission may puncture the sPDSCH or the sPDSCH may be rate-matched accordingly (i.e., without being punctured). That is, the sPDSCH may be rate-matched around the broadcast transmission resources.

As described with reference to FIG. 2, DMRS may in some cases be shared across consecutive sTTIs 325. For example, if DMRS is sent in sTTI 325-b, a UE 115 may receive an indication in sTTI 325-c to reuse the DMRS from sTTI 325-b. By way of example, such DMRS sharing may be supported (e.g., or required) for sPDSCH transmissions with more than two spatial layers (e.g., three spatial layers, four spatial layers, etc.) across consecutive sTTIs 325. In some cases, time-based restrictions on DMRS sharing may be employed to facilitate network management. For example, DMRS sharing may be allowed across slots 315-a and 315-b of a given subframe 310 (e.g., between sTTI 325-c and sTTI 325-d) but may not be allowed across different subframes 310.

Considerations are outlined herein for reconciling DMRS sharing across sTTIs 325 with the potential for collisions between an sPDSCH transmission and a broadcast transmission (e.g., PBCH, PSS, SSS). Aspects of the following are described with reference to resource pattern 330-a, though it is to be understood that the described techniques may equally apply to resource pattern 330-b As an example, if a sPDSCH allocation collides with the transmission of PSS and SSS and a UE 115 receives an indication in sTTI 325-c to use the DMRS from sTTI 325-b, DMRS sharing may proceed without issue (e.g., since the sPDSCH may not be mapped to the RBs allocated for PSS and SSS in both sTTIs 325). Alternatively, if the sPDSCH allocation collides with the transmission of PSS and SSS and the UE 115 receives an indication in sTTI 325-d to reuse DMRS sent in sTTI 325-c, an issue with DMRS sharing may arise (e.g., because the PSS and SSS in sTTI 325-c may puncture the sPDSCH such that DMRS is not sent over the portion of sTTI 325-c occupied by PSS and SSS or because the sPDSCH may be rate-matched around the PSS and SSS). Similarly, if the sPDSCH allocation collides with PBCH and the UE 115 receives an indication in sTTI 325-e to reuse DMRS sent in sTTI 325-d, DMRS sharing may proceed without issue (e.g., since the sPDSCH may not be mapped to RBs allocated for PBCH in both sTTIs 325). Alternatively, if the sPDSCH allocation collides with PBCH and the UE 115 receives an indication in sTTI 325-f to reuse the DMRS in sTTI 325-e, an issue with DMRS sharing may arise (e.g., because the PBCH in sTTI 325-e may puncture the sPDSCH such that DMRS is not sent over the portion of sTTI 325-e occupied by PBCH or because the sPDSCH may be rate-matched around the PBCH).

Various techniques for supporting DMRS sharing for sPDSCH are considered herein. In a first example, for sPDSCH transmissions over one or two spatial layers, if the sPDSCH is at least partially overlapping with a broadcast transmission (e.g., a PBCH, PSS, and/or SSS) in a first sTTI 325 but not a second sTTI 325 immediately subsequent to the first sTTI 325, DMRS sharing may be prohibited across these two sTTIs 325. That is, the UE 115 may expect to receive DMRS in the first sTTI 325 and in the second sTTI 325. In a second example, if the sPDSCH is at least partially overlapping with a broadcast transmission (e.g., a PBCH, PSS, and/or SSS) in a first sTTI 325 but not a second sTTI 325 immediately subsequent to the second sTTI 325, DMRS sharing across these two sTTIs may be supported, as described below with reference to FIG. 4.

Aspects of the described techniques may be extended to one-slot DMRS-based sPDSCH. That is, aspects of the techniques described with reference to the two-symbol sTTIs 325 above may be relevant to one-slot sTTIs (i.e., which may span slot 315-a or slot 315-b, for example). For example, for the first one-slot sPDSCH in a subframe 310, one pair of DMRS may be placed in the fourth and fifth OFDM symbols (i.e., the symbols indexed '3' and '4') of the first slot 315 (e.g., slot 315-a). Similarly, for the second one-slot sPDSCH in a subframe 310, one pair of DMRS may be placed in the third and fourth OFDM symbols (i.e., the symbols indexed '2' and '3') of the second slot 315 (e.g., slot 315-b).

Considerations for multiplexing one-slot sPDSCH with PSS and SSS are outlined herein. For the first slot of the first subframe 310 (subframe 0) and the sixth subframe (subframe 5) of a radio frame 305, the transmission of PSS and SSS may not collide with the DMRS (e.g., because the PSS and SSS transmission occur in the sixth and seventh OFDM symbols of the slot while the DMRS transmission occurs in the fourth and fifth OFDM symbols of the slot). In some such cases, the one-slot sPDSCH may be rate-matched around the PSS and SSS transmissions. Alternatively, since as many as three symbols of the slot may be allocated for sPDCCH (e.g., depending on the resource pattern 330, such as sTTI 325-*a* or sTTI 325-*f* of resource pattern 330-*a* or sTTI 325-*h* or sTTI 325-1 of resource pattern 330-*b*) and the last two symbols of the slot may be at least partially occupied by PSS and SSS, the number of symbols available for the one-slot sPDSCH in the RBs allocated to PSS and SSS may be between two (e.g., in the case that three symbols are allocated for sPDCCH) and four (e.g., in the case that one symbol is allocated for sPDCCH). Accordingly, in some cases the one-slot sPDSCH may not be mapped to the RBs that are partially occupied by PSS and SSS. Additionally or alternatively, the one-slot sPDSCH may be mapped to the RBs partially occupied based on a control format indicator (CFI) value, where the CFI value indicates a resource pattern 330 (e.g., if CFI=1, then 1-slot sPDSCH is mapped to the RBs, but if CFI=2 or CFI=3, then 1-slot sPDSCH may not be mapped to the RBs). Accordingly, whether or not the one-slot sPDSCH is mapped to the RBs partially occupied may be based on a number of OFDM symbols available to carry sPDSCH in these RBs.

Similar considerations for multiplexing one-slot sPDSCH with PBCH are outlined herein. When the sPDSCH resource allocation overlaps at least partially in time with PBCH, the one-slot sPDSCH DMRS may not be sent (e.g., because the one-slot sPDSCH may be rate-matched around the PBCH resources). In some such cases (e.g., in the case of UE-specific reference signals, such as one-slot sPDSCH DMRS), the one-slot sPDSCH may not be mapped to the RBs (e.g., the physical RBs (PRBs)) colliding with the PBCH. Such techniques may also be used for two-symbol or three-symbol sPDSCH allocations. For example, if a two-symbol or three-symbol sPDSCH resource allocation overlaps at least partially in time with a PBCH (or synchronization signals such as PSS or SSS), the two-symbol or three-symbol sPDSCH may not be mapped to the RBs (e.g., the PRBs) colliding with the PBCH (or synchronization signals). Additionally or alternatively, in some cases the one-slot sPDSCH may be mapped to the RBs colliding with the PBCH (e.g., if the UE 115 receives an indication that DMRS from the preceding slot should be reused). Various examples are considered in accordance with these techniques. In a first example, DMRS for the entire sPDSCH allocation in the slot may be used from the previous one-slot sTTI. In a second example, only the DMRS overlapping with the RBs carrying PBCH may be reused from the previous one-slot sTTI (e.g., and the other RBs in the sPDSCH allocation may carry new DMRS).

In some of the examples described above, in the case of a two-symbol sTTI 325, if only one RB is available within a precoding resource block group (PRG) or shortened PRG (sPRG), sPDSCH may not be mapped to the single RB. For example, if the PRG includes a set of RBs allocated to broadcast transmissions and a single RB outside of the RBs allocated to the broadcast transmissions, and if it is determined that the set of RBs allocated to the broadcast transmissions do not carry sPDSCH, the single remaining RB may not carry sPDSCH either. Analogous considerations may be employed for a one-slot sTTI. That is, if a similar requirement is defined for the one-slot sPDSCH and only a single RB is available within a PRG due to collision with a broadcast transmission, the one-slot sPDSCH may not be mapped to the single remaining RB.

Considerations for multiplexing sPDCCH with broadcast transmissions are additionally outlined herein. For example, the control RB set may be configured by higher layer signaling. When the configured RB set collides with a broadcast transmission, a UE 115 may assume that its control information is rate-matched around the RBs used for the broadcast transmission. That is, all of the control channel elements (CCEs) or shortened CCEs (sCCEs) colliding with the broadcast transmissions may not be used to carry sPDCCH. Alternatively, in some systems the control RB set may not be configured over the RBs associated with the broadcast transmissions (e.g., the six central RBs).

Figure 4:
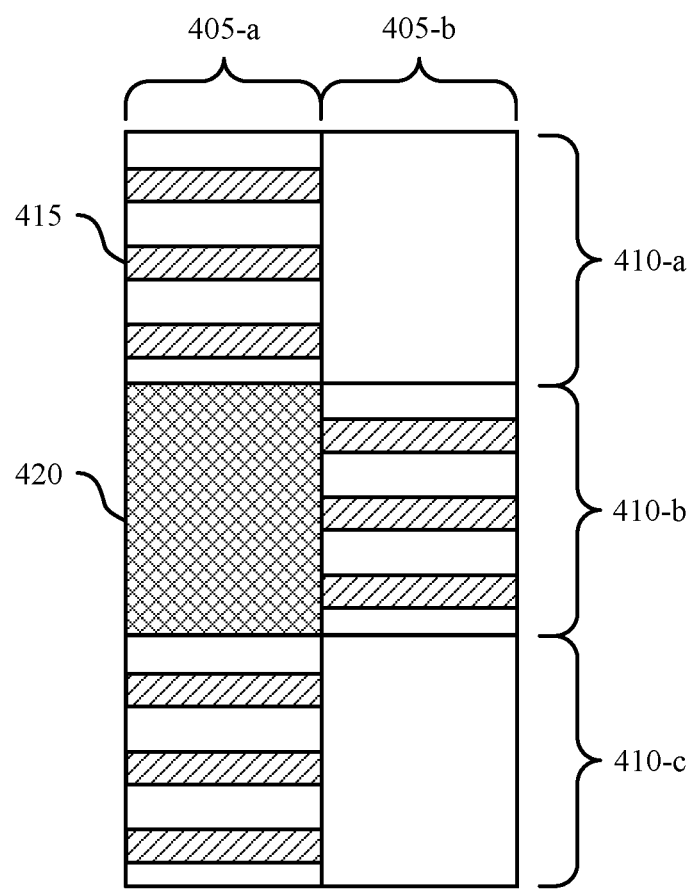
FIGS. 4 and 5 illustrate example resource patterns that support low latency multiplexing operations in accordance with aspects of the present disclosure.

FIG. 4 illustrates an example of a resource pattern 400 that supports low latency multiplexing operations in accordance with various aspects of the present disclosure. Resource pattern 400 may be applicable to a UE 115 or a base station 105 as described herein and may implement aspects of wireless communications system 100 and wireless communications system 200. Resource pattern 400 includes sTTI 405-*a* and sTTI 405-*b*, each of which may be an example of the corresponding time intervals described above (e.g., with reference to FIG. 3). Each of sTTI 405-*a* and sTTI 405-*b* span a first set of frequency resources 410-*a*, a second set of frequency resources 410-*b*, and a third set of frequency resources 410-*c*. Although illustrated as being coextensive in frequency for the sake of explanation, it is to be understood that in some cases sTTI 405-*a* and sTTI 405-*b* may overlap partially or otherwise be distinguished from each other in frequency.

In the example illustrated by resource pattern 400, sTTI 405-*a* includes a broadcast transmission 420 (e.g., which may refer to PSS, SSS, PBCH, or any combination thereof). Broadcast transmission 420 spans the second set of frequency resources 410-*b* (e.g., which may correspond to a central set of six RBs as described with reference to FIG. 3). sTTI 405-*a* additionally includes DMRS 415 (e.g., covering first frequency resources 410-*a* and third frequency resources 410-*c*). In some cases, DMRS sharing may be configured for sTTI 405-*a* and sTTI 405-*b* (i.e., a UE 115 may be indicated to reuse the DMRS from sTTI 405-*a* to perform channel estimation for sTTI 405-*b*). In some such examples, DMRS 415 may not be transmitted over first frequency resources 410-*a* and third frequency resources 410-*c* in sTTI 405-*b*, but may be transmitted over second frequency resources 410-*b* (i.e., the RBs colliding with broadcast transmission 420) in sTTI 405-*b*.

Figure 5:
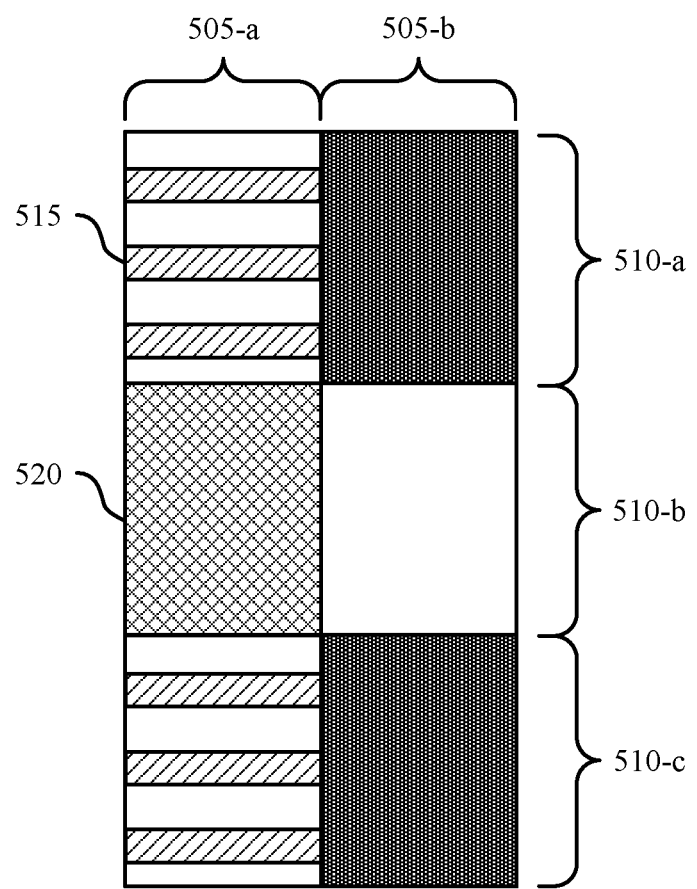

FIG. 5 illustrates an example of a resource pattern 500 that supports low latency multiplexing operations in accordance with various aspects of the present disclosure. Resource pattern 500 may be applicable to a UE 115 or a base station 105 as described herein and may implement aspects of wireless communications system 100 and wireless communications system 200. Resource pattern 500 includes sTTI 505-*a* and sTTI 505-*b*, each of which may be an example of the corresponding time intervals described above (e.g., with reference to FIG. 3). Each of sTTI 505-*a* and sTTI 505-*b* span a first set of frequency resources 510-*a*, a second set of frequency resources 510-*b*, and a third set of frequency resources 510-*c*. Although illustrated as being coextensive in frequency for the sake of explanation, it is to be understood that in some cases sTTI 505-*a* and sTTI 505-*b* may overlap partially or otherwise be distinguished from each other in frequency.

In the example illustrated by resource pattern 500, sTTI 505-a includes a broadcast transmission 520 (e.g., which may refer to PSS, SSS, PBCH, or any combination thereof). Broadcast transmission 520 spans the second set of frequency resources 510-b (e.g., which may correspond to a central set of six RBs as described with reference to FIG. 3). sTTI 505-a additionally includes DMRS 515 (e.g., covering first frequency resources 510-a and third frequency resources 510-c). In some cases, DMRS sharing may be configured for sTTI 505-a and sTTI 505-b (i.e., a UE 115 may be indicated to reuse the DMRS from sTTI 505-a to perform channel estimation for sTTI 505-b). In some such examples, DMRS 515 may not be transmitted over first frequency resources 510-a and third frequency resources 510-c in sTTI 505-b.

By way of example, a base station 105 may transmit a downlink grant scheduling a downlink data transmission over at least portions of first frequency resources 510-a, second frequency resources 510-b, and third frequency resources 510-c (e.g., or a subset thereof). A UE 115 receiving the downlink grant may, in accordance with the described techniques, obtain a channel estimate for first frequency resources 510-a and/or third frequency resources 510-c (e.g., or portions thereof) in sTTI 505-b based on the DMRS 515 transmitted over the corresponding resources during sTTI 505-a. For example, the downlink grant may include an indication that the DMRS 515 of sTTI 505-a is to be applied to obtain channel estimates during sTTI 505-b. In accordance with the described techniques, the base station 105 may transmit the scheduled downlink data transmission rate-matched around second frequency resources 510-b in sTTI 505-b (e.g., transmitted using first frequency resources 510-a and third frequency resources 510-c). The UE 115 may in turn refrain from applying the channel estimate obtained based on DMRS 515 in sTTI 505-a to second frequency resources 510-b in sTTI 505-b (e.g., may identify that the scheduled downlink data transmission is to be rate-matched around second frequency resources 510-b in sTTI 505-b). That is, the base station 105 and the UE 115 may determine that second frequency resources 510-b in sTTI 505-a contain broadcast transmission 520 (e.g., and therefore do not contain any DMRS 515 which can be used to obtain a channel estimate for second frequency resources 510-b in sTTI 505-b). More succinctly put, a downlink data transmission (e.g., a sPDSCH) may not be mapped to any PRBs in the frequency domain that carried a broadcast transmission 520 (e.g., a PBCH, PSS, or SSS) within the OFDM symbols of a previous sTTI 505 (or subslot).

Figure 6:
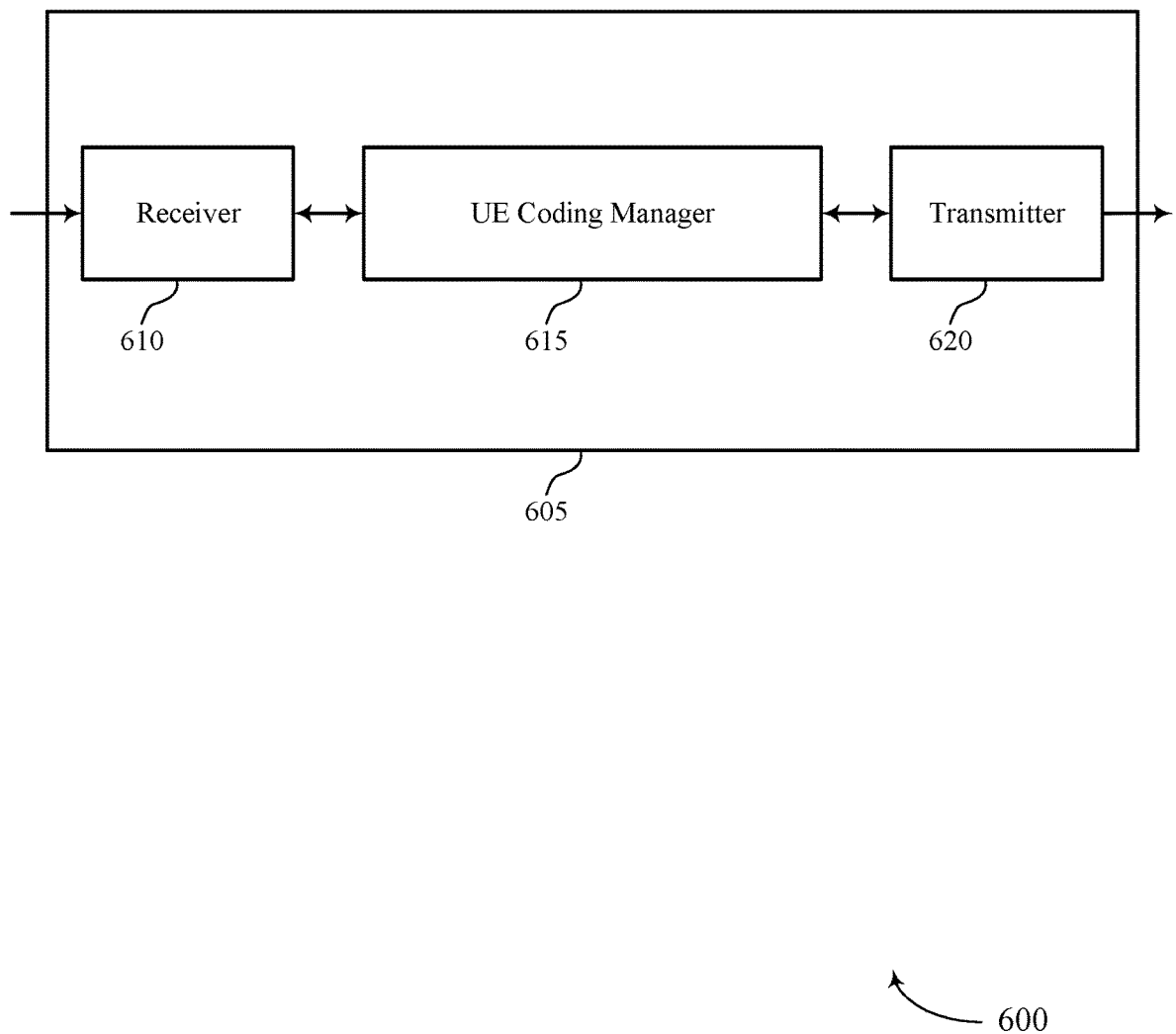
FIGS. 6 through 8 show block diagrams of a device that supports low latency multiplexing operations in accordance with aspects of the present disclosure.

FIG. 6 shows a block diagram 600 of a device 605 that supports low latency multiplexing operations in accordance with aspects of the present disclosure. The device 605 may be an example of aspects of a UE 115 as described herein. The device 605 may include a receiver 610, an UE coding manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to low latency multiplexing operations, etc.). Information may be passed on to other components of the device 605. The receiver 610 may be an example of aspects of the transceiver 920 described with reference to FIG. 9. The receiver 610 may utilize a single antenna or a set of antennas.

The UE coding manager 615 may determine whether one or more broadcast signals over a first frequency range and a reference signal over a second frequency range are both received within a first TTI, receive, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI, and determine whether to monitor for the scheduled downlink data transmission based on determining whether the one or more broadcast signals and the reference signal are received within the first TTI. The UE coding manager 615 may be an example of aspects of the UE coding manager 910 described herein.

The UE coding manager 615, or its sub-components, may be implemented in hardware, code (e.g., software or firmware) executed by a processor, or any combination thereof. If implemented in code executed by a processor, the functions of the UE coding manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE coding manager 615, or its sub-components, may be physically located at various positions, including being distributed such that portions of functions are implemented at different physical locations by one or more physical components. In some examples, the UE coding manager 615, or its sub-components, may be a separate and distinct component in accordance with various aspects of the present disclosure. In some examples, the UE coding manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
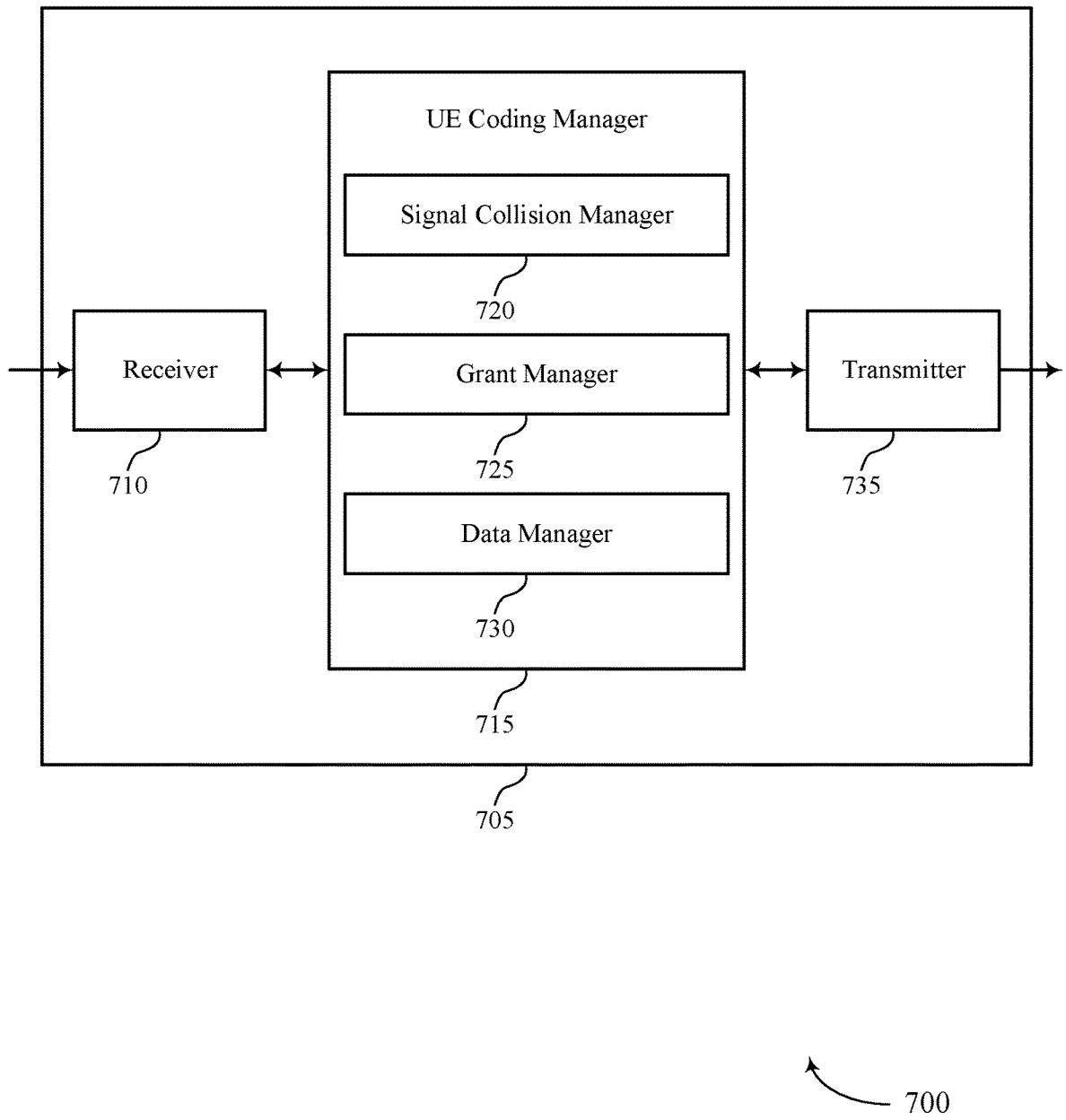

FIG. 7 shows a block diagram 700 of a device 705 that supports low latency multiplexing operations in accordance with aspects of the present disclosure. The device 705 may be an example of aspects of a device 605, or a UE 115 as described herein. The device 705 may include a receiver 710, an UE coding manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to low latency multiplexing operations, etc.). Information may be passed on to other components of the device 705. The receiver 710 may be an example of aspects of the transceiver 920 described with reference to FIG. 9. The receiver 710 may utilize a single antenna or a set of antennas.

The UE coding manager 715 may be an example of aspects of the UE coding manager 615 as described herein. The UE coding manager 715 may include a signal collision manager 720, a grant manager 725, and a data manager 730. The UE coding manager 715 may be an example of aspects of the UE coding manager 910 described herein.

The signal collision manager 720 may determine whether one or more broadcast signals over a first frequency range and a reference signal over a second frequency range are both received within a first TTI.

The grant manager 725 may receive, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI.

The data manager 730 may determine whether to monitor for the scheduled downlink data transmission based on determining whether the one or more broadcast signals and the reference signal are received within the first TTI.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
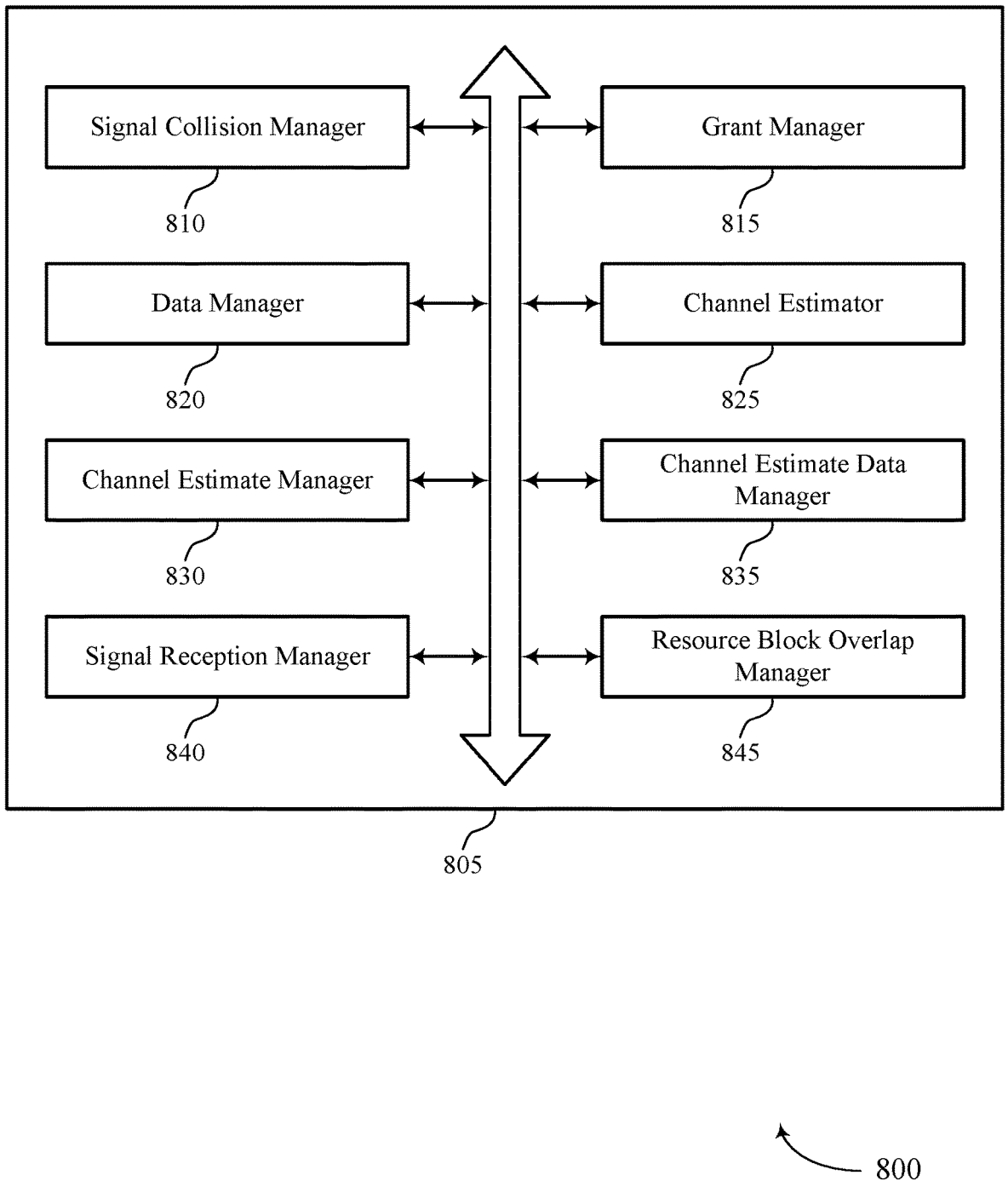

FIG. 8 shows a block diagram 800 of a UE coding manager 805 that supports low latency multiplexing operations in accordance with aspects of the present disclosure. The UE coding manager 805 may be an example of aspects of a UE coding manager 615, a UE coding manager 715, or a UE coding manager #10 described herein. The UE coding manager 805 may include a signal collision manager 810, a grant manager 815, a data manager 820, a channel estimator 825, a channel estimate manager 830, a channel estimate data manager 835, a signal reception manager 840, and a resource block overlap manager 845. Each of these modules may communicate, directly or indirectly, with one another (e.g., via one or more buses).

The signal collision manager 810 may determine whether one or more broadcast signals over a first frequency range and a reference signal over a second frequency range are both received within a first TTI. In some cases, the second frequency range is disjoint from the first frequency range. In some cases, the one or more broadcast signals includes a PSS, a SSS, a PBCH, or a combination thereof.

The grant manager 815 may receive, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI. In some cases, the one or more broadcast signals are transmitted within a subframe whose duration is longer than and overlaps with the first TTI and the subsequent TTI. In some cases, the first TTI and the subsequent TTI include temporally adjacent TTIs.

The data manager 820 may determine whether to monitor for the scheduled downlink data transmission based on determining whether the one or more broadcast signals and the reference signal are received within the first TTI. In some examples, the data manager 820 may determine to monitor for the scheduled downlink data transmission rate-matched around the first frequency range in the subsequent TTI based on the one or more broadcast signals and the reference signal both being received within the first TTI. In some examples, the data manager 820 may determine to decode the scheduled downlink data transmission without rate-matching based on the one or more broadcast signals and the reference signal not being received within the same TTI.

The channel estimator 825 may obtain, in accordance with the indication, a channel estimate for the second frequency range in the subsequent TTI based on the reference signal.

The channel estimate manager 830 may refrain from applying the channel estimate to the first frequency range in the subsequent TTI.

The channel estimate data manager 835 may receive the scheduled downlink data transmission during the subsequent TTI based on the channel estimate. In some examples, the channel estimate data manager 835 may receive the scheduled downlink data transmission rate-matched around the first frequency range in the subsequent TTI.

The signal reception manager 840 may receive the one or more broadcast signals and a downlink data transmission in the first TTI, where at least one of the one or more broadcast signals and the downlink data transmission overlap in at least one RB, and where the downlink data transmission includes 1-slot PDSCH. In some examples, the signal reception manager 840 may receive the one or more broadcast signals and the reference signal in the first TTI, where at least one of the one or more broadcast signals and the reference signal overlap in at least one RB. In some examples, the signal reception manager 840 may receive the scheduled downlink data transmission in only the second frequency range of the subsequent TTI based on the at least one of the one or more broadcast signals and the reference signal overlapping in the at least one RB, where the scheduled downlink transmission includes an RB distinct from the at least one RB. In some cases, the scheduled downlink data transmission includes a 1-slot PDSCH and the one or more broadcast signals include a PBCH. In some cases, the one or more broadcast signals include at least one of a PSS, a SSS, a PBCH, or combinations thereof. In some cases, the single RB is available within a PRG.

The resource block overlap manager 845 may determine that only a single RB is available to receive the scheduled downlink data transmission based on the overlap of the at least one of the one or more broadcast signals and the reference signal in the at least one RB in the first TTI. In some examples, the resource block overlap manager 845 may refrain from monitoring for the scheduled downlink data transmission during the subsequent TTI based on the scheduled downlink data transmission being a 1-slot PDSCH and based on the one or more broadcast signals and the reference signal both being received within the first TTI.

Figure 9:
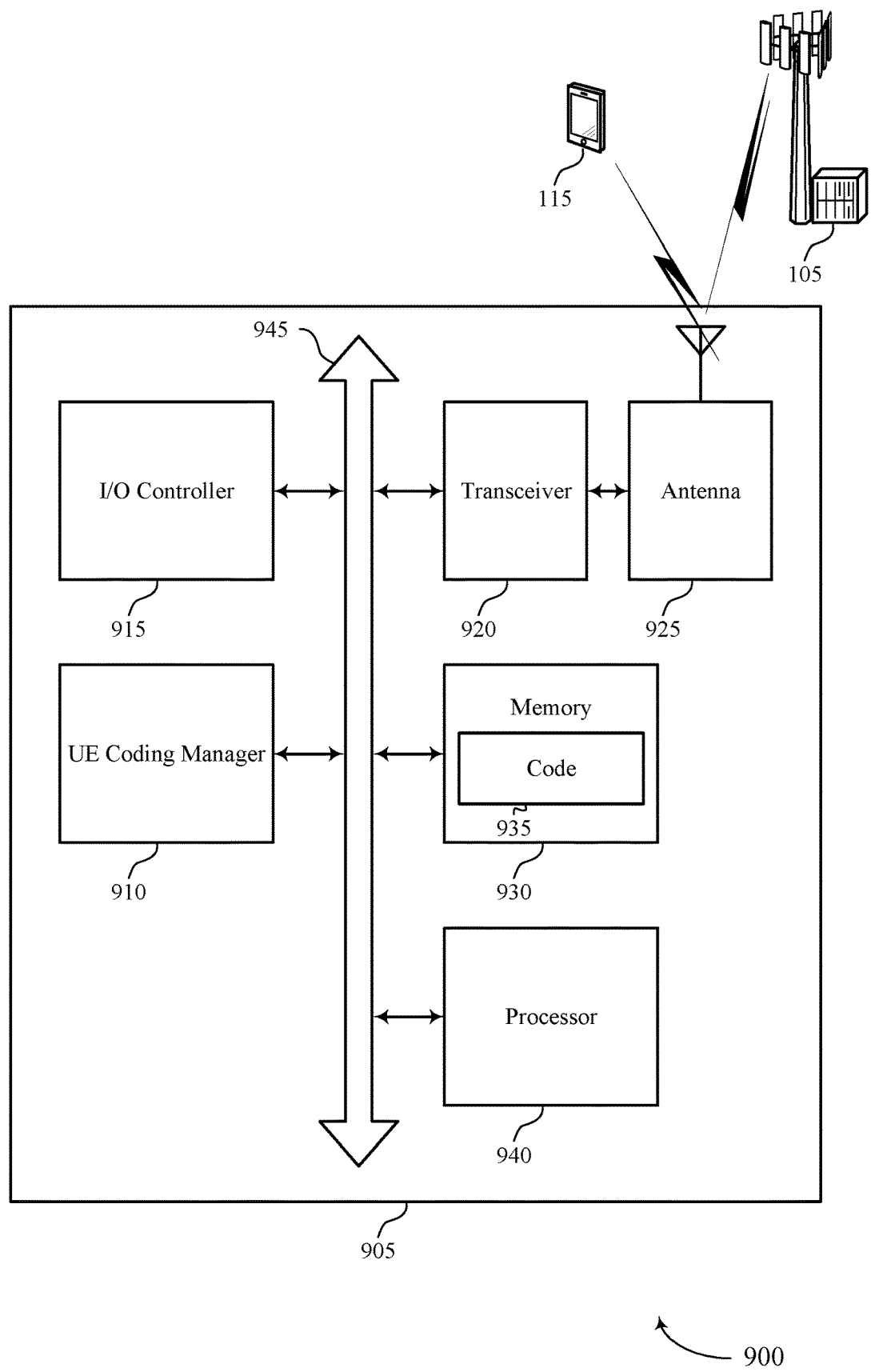
FIG. 9 illustrates a block diagram of a system including a UE that supports low latency multiplexing operations in accordance with aspects of the present disclosure.

FIG. 9 shows a diagram of a system 900 including a device 905 that supports low latency multiplexing operations in accordance with aspects of the present disclosure. The device 905 may be an example of or include the components of device 605, device 705, or a UE 115 as described herein. The device 905 may include components for bi-directional voice and data communications including components for transmitting and receiving communications, including an UE coding manager 910, an I/O controller 915, a transceiver 920, an antenna 925, memory 930, and a processor 940. These components may be in electronic communication via one or more buses (e.g., bus 945).

The UE coding manager 910 may determine whether one or more broadcast signals over a first frequency range and a reference signal over a second frequency range are both received within a first TTI, receive, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI, and determine whether to monitor for the scheduled downlink data transmission based on determining whether the one or more broadcast signals and the reference signal are received within the first TTI.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting low latency multiplexing operations).

The code 935 may include instructions to implement aspects of the present disclosure, including instructions to support PREAMBLE. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
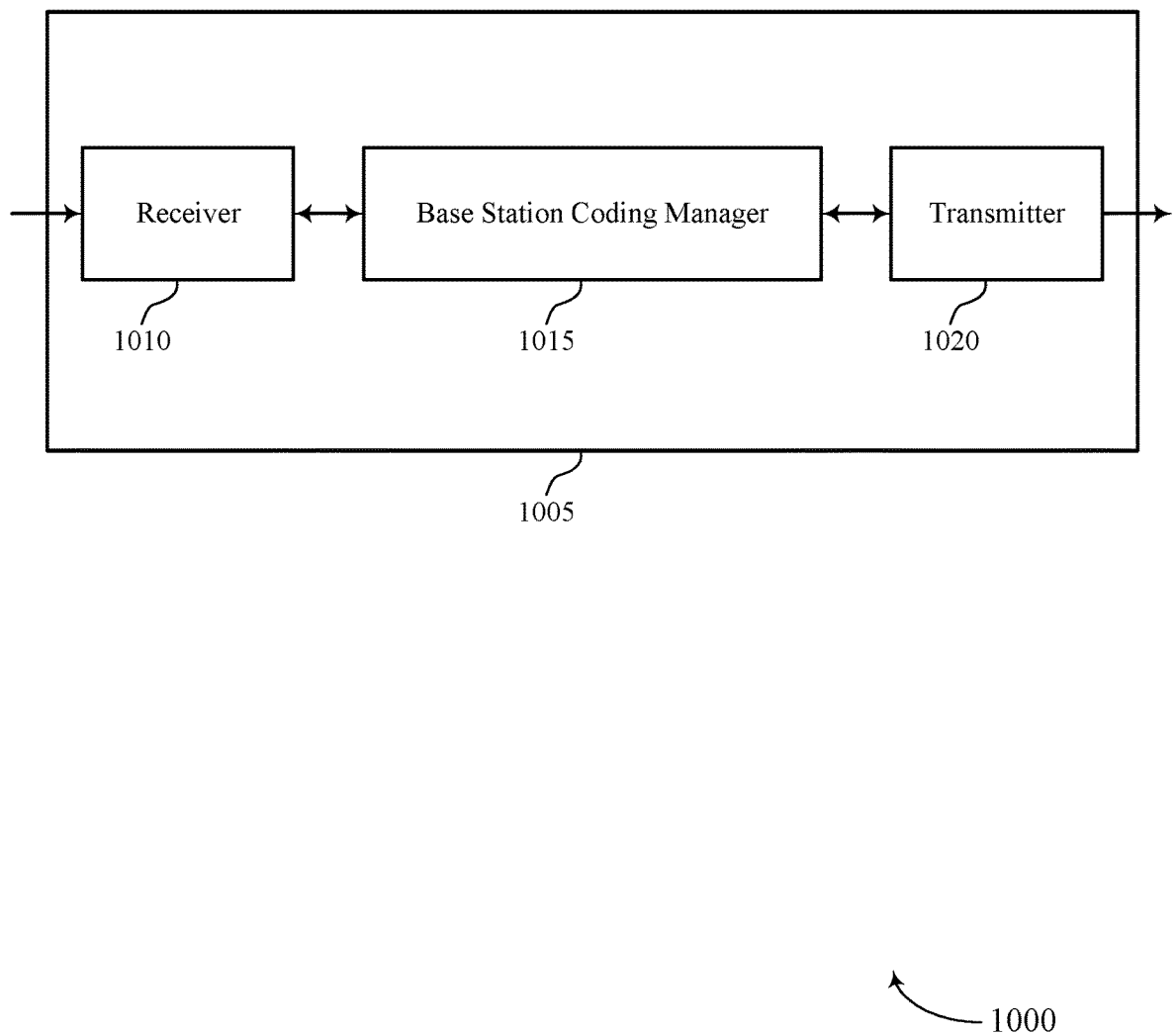
FIGS. 10 through 12 show block diagrams of a device that supports low latency multiplexing operations in accordance with aspects of the present disclosure.

FIG. 10 shows a block diagram 1000 of a device 1005 that supports low latency multiplexing operations in accordance with aspects of the present disclosure. The device 1005 may be an example of aspects of a base station 105 as described herein. The device 1005 may include a receiver 1010, a base station coding manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to low latency multiplexing operations, etc.). Information may be passed on to other components of the device 1005. The receiver 1010 may be an example of aspects of the transceiver 1320 described with reference to FIG. #. The receiver 1010 may utilize a single antenna or a set of antennas.

The base station coding manager 1015 may transmit, during a first TTI, one or more broadcast signals to a UE over a first frequency range, transmit, during the first TTI, a reference signal over a second frequency range, and transmit, during a subsequent TTI, a downlink grant to the UE scheduling a downlink data transmission over at least portions of both the first frequency range and the second frequency range, where the downlink grant includes an indication of whether the UE is to apply the reference signal to the subsequent TTI. The base station coding manager 1015 may be an example of aspects of the base station coding manager 1310 described herein.

The base station coding manager 1015, or its sub-components, may be implemented in hardware, code (e.g., software or firmware) executed by a processor, or any combination thereof. If implemented in code executed by a processor, the functions of the base station coding manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station coding manager 1015, or its sub-components, may be physically located at various positions, including being distributed such that portions of functions are implemented at different physical locations by one or more physical components. In some examples, the base station coding manager 1015, or its sub-components, may be a separate and distinct component in accordance with various aspects of the present disclosure. In some examples, the base station coding manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
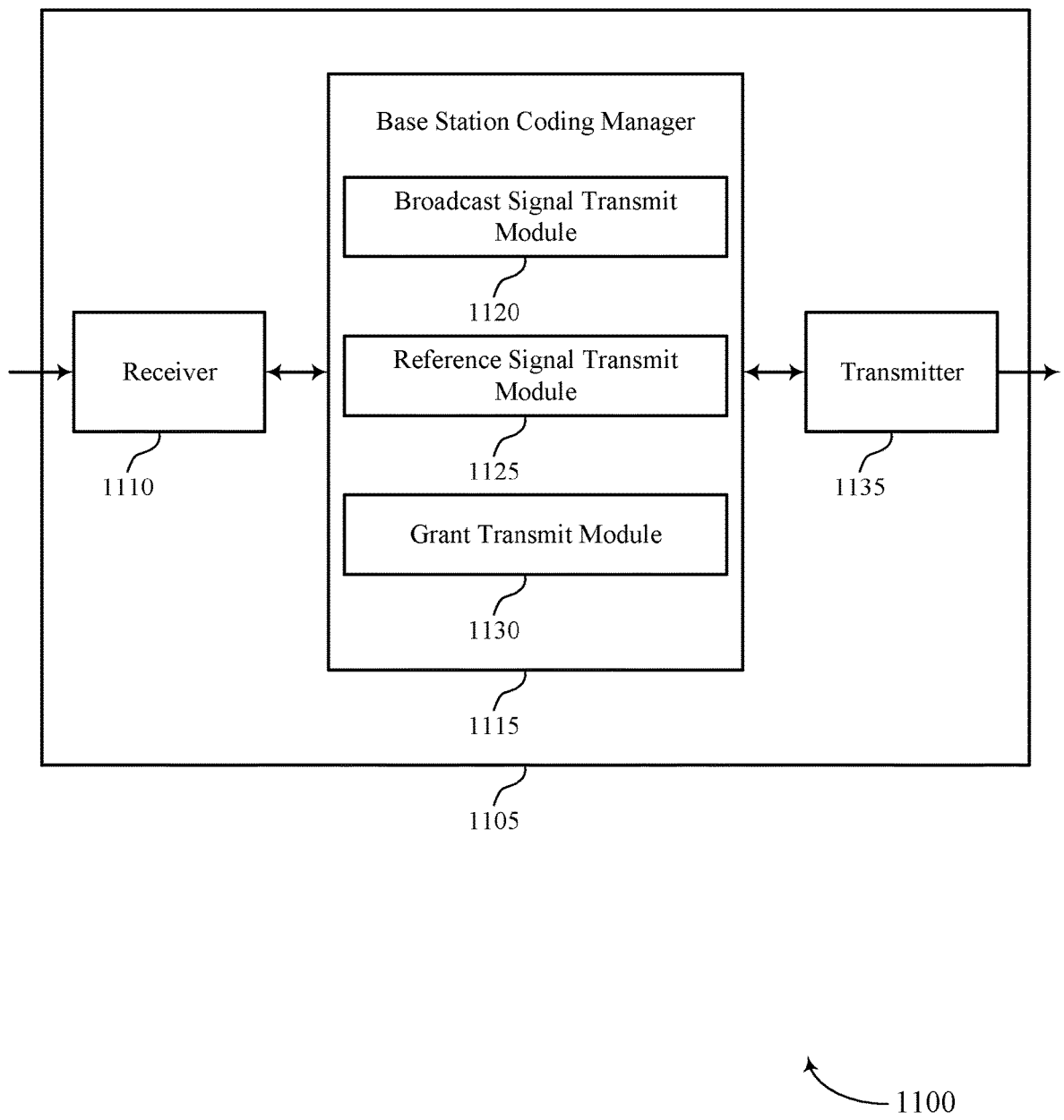

FIG. 11 shows a block diagram 1100 of a device 1105 that supports low latency multiplexing operations in accordance with aspects of the present disclosure. The device 1105 may be an example of aspects of a device 1005, or a base station 105 as described herein. The device 1105 may include a receiver 1110, a base station coding manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to low latency multiplexing operations, etc.). Information may be passed on to other components of the device 1105. The receiver 1110 may be an example of aspects of the transceiver 1320 described with reference to FIG. 13. The receiver 1110 may utilize a single antenna or a set of antennas.

The base station coding manager 1115 may be an example of aspects of the base station coding manager 1015 as described herein. The base station coding manager 1115 may include a broadcast signal transmit module 1120, a reference signal transmit module 1125, and a grant transmit module 1130. The base station coding manager 1115 may be an example of aspects of the base station coding manager 1310 described herein.

The broadcast signal transmit module 1120 may transmit, during a first TTI, one or more broadcast signals to a UE over a first frequency range.

The reference signal transmit module 1125 may transmit, during the first TTI, a reference signal over a second frequency range.

The grant transmit module 1130 may transmit, during a subsequent TTI, a downlink grant to the UE scheduling a downlink data transmission over at least portions of both the first frequency range and the second frequency range, where the downlink grant includes an indication of whether the UE is to apply the reference signal to the subsequent TTI.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
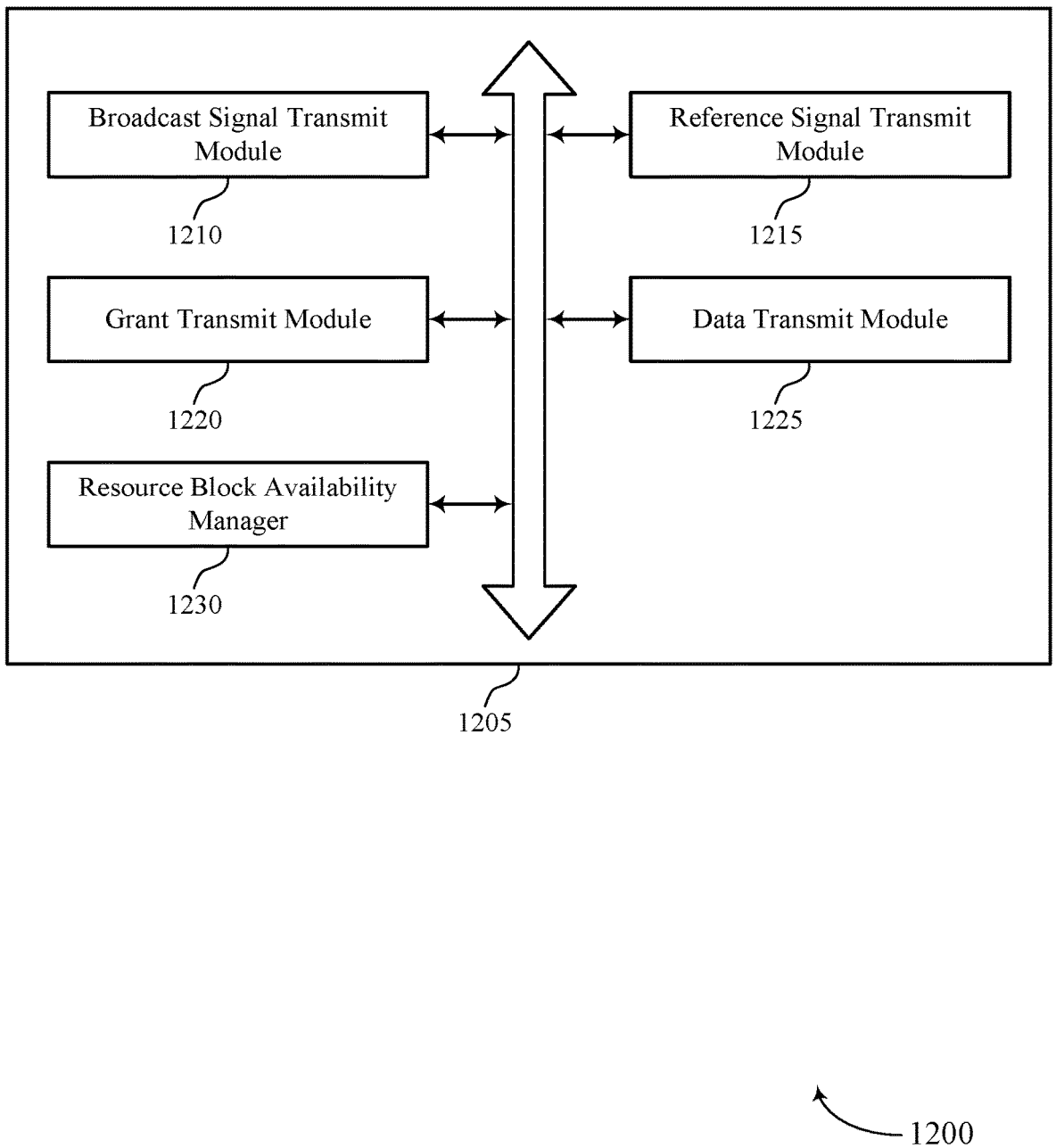

FIG. 12 shows a block diagram 1200 of a base station coding manager 1205 that supports low latency multiplexing operations in accordance with aspects of the present disclosure. The base station coding manager 1205 may be an example of aspects of a base station coding manager 1015, a base station coding manager 1115, or a base station coding manager 1310 described herein. The base station coding manager 1205 may include a broadcast signal transmit module 1210, a reference signal transmit module 1215, a grant transmit module 1220, a data transmit module 1225, and a resource block availability manager 1230. Each of these modules may communicate, directly or indirectly, with one another (e.g., via one or more buses).

The broadcast signal transmit module 1210 may transmit, during a first TTI, one or more broadcast signals to a UE over a first frequency range. In some cases, the one or more broadcast signals are transmitted within a subframe whose duration is longer than and overlaps with the first TTI and the subsequent TTI. In some cases, the one or more broadcast signals include a PSS, a SSS, a PBCH, or a combination thereof.

The reference signal transmit module 1215 may transmit, during the first TTI, a reference signal over a second frequency range.

The grant transmit module 1220 may transmit, during a subsequent TTI, a downlink grant to the UE scheduling a downlink data transmission over at least portions of both the first frequency range and the second frequency range, where the downlink grant includes an indication of whether the UE is to apply the reference signal to the subsequent TTI. In some cases, the first TTI and the subsequent TTI include temporally adjacent TTIs.

The data transmit module 1225 may transmit the scheduled downlink data transmission over the second frequency range during the subsequent TTI. In some examples, the data transmit module 1225 may transmit the scheduled downlink data transmission rate-matched around the first frequency range in the subsequent TTI. In some examples, the data transmit module 1225 may transmit the scheduled downlink data transmission in only the second frequency range of the subsequent TTI based on the at least one of the one or more broadcast signals and the reference signal overlapping in at least one RB, where the scheduled downlink transmission includes an RB distinct from the at least one RB. In some cases, the scheduled downlink data transmission includes a 1-slot PDSCH and the one or more broadcast signals include a PBCH.

The resource block availability manager 1230 may determine that only a single RB is available to transmit the scheduled downlink data transmission. In some examples, the resource block availability manager 1230 may refrain from transmitting the scheduled downlink data transmission during the subsequent TTI based on the scheduled downlink data transmission being a 1-slot PDSCH and based on the one or more broadcast signals and the reference signal being both transmitted within the first TTI. In some cases, the one or more broadcast signals include at least one of a PSS, a SSS, a PBCH, or combinations thereof. In some cases, the single RB is available within a PRG.

Figure 13:
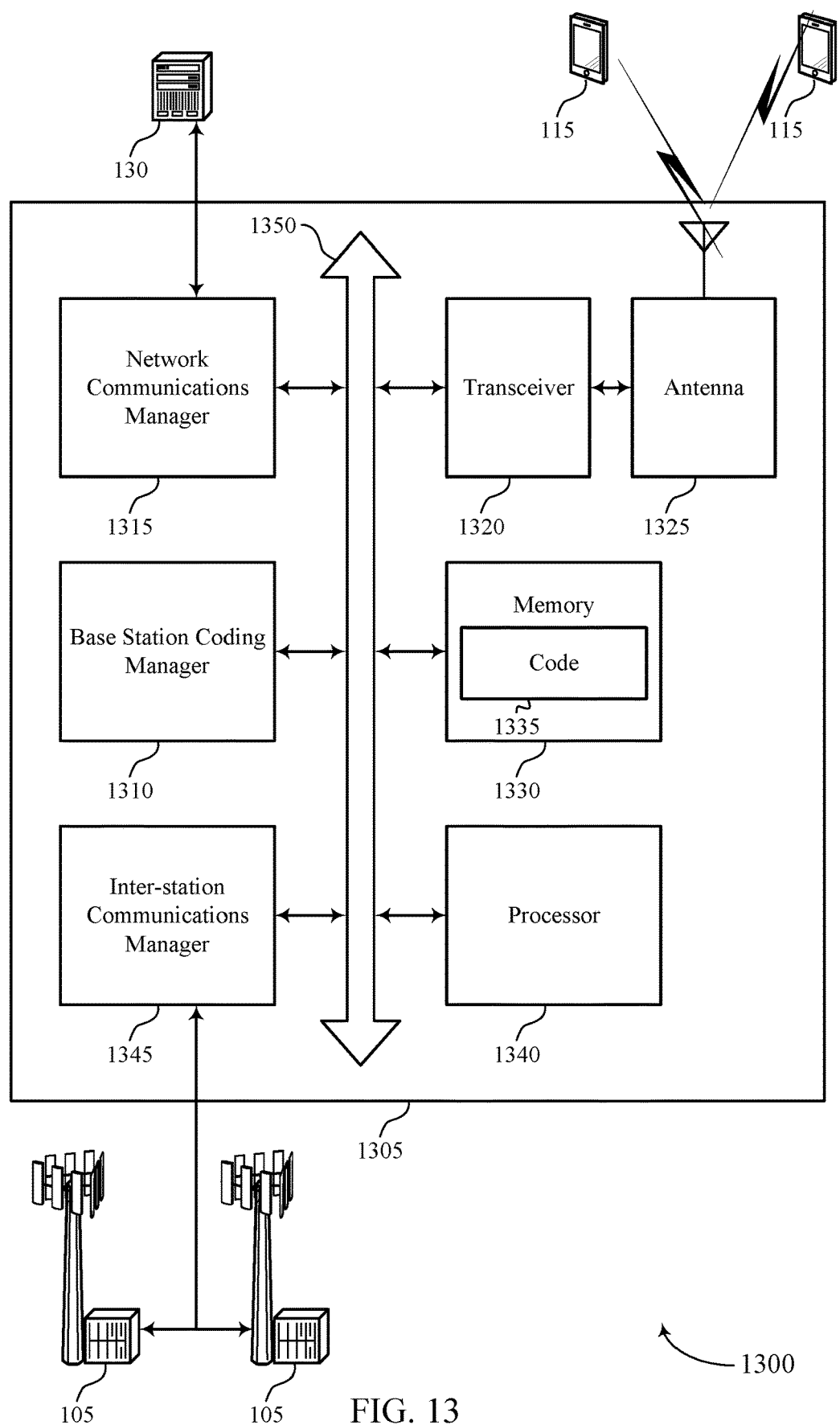
FIG. 13 illustrates a block diagram of a system including a base station that supports low latency multiplexing operations in accordance with aspects of the present disclosure.

FIG. 13 shows a diagram of a system 1300 including a device 1305 that supports low latency multiplexing operations in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station coding manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station coding manager 1310 may transmit, during a first TTI, one or more broadcast signals to a UE over a first frequency range, transmit, during the first TTI, a reference signal over a second frequency range, and transmit, during a subsequent TTI, a downlink grant to the UE scheduling a downlink data transmission over at least portions of both the first frequency range and the second frequency range, where the downlink grant includes an indication of whether the UE is to apply the reference signal received to the subsequent TTI.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device #{device} to perform various functions (e.g., functions or tasks supporting low latency multiplexing operations).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support PREAMBLE. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
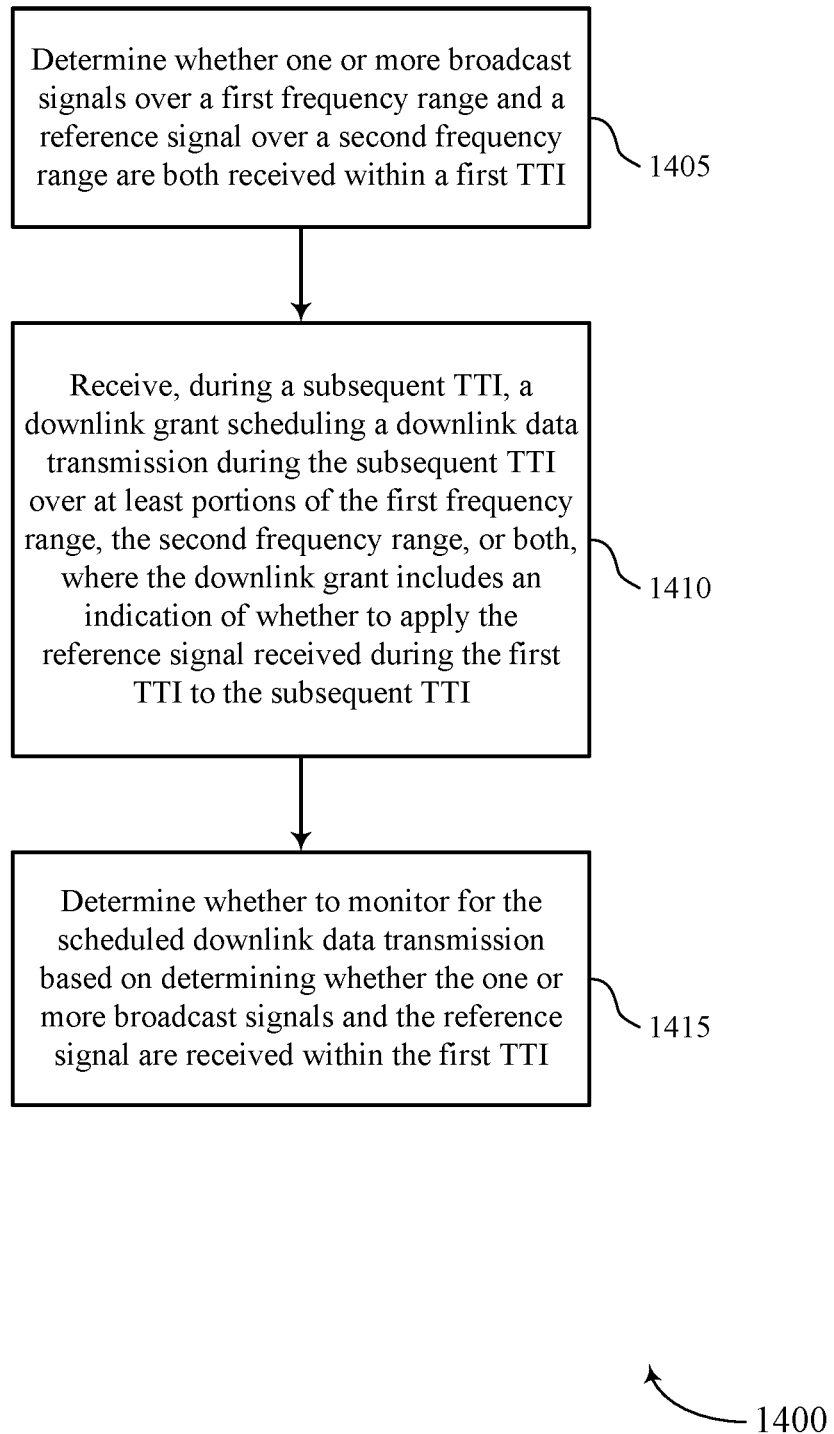
FIGS. 14 through 21 illustrate methods for low latency multiplexing operations in accordance with aspects of the present disclosure.

FIG. 14 shows a flowchart illustrating a method 1400 that supports low latency multiplexing operations in accordance with aspects of the present disclosure. The operations of method 1400 may be implemented by a UE 115 or its components as described herein. For example, the operations of method 1400 may be performed by a UE coding manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may determine whether one or more broadcast signals over a first frequency range and a reference signal over a second frequency range are both received within a first TTI. The operations of 1405 may be performed according to the methods described herein. In some examples, aspects of the operations of 1405 may be performed by a signal collision manager as described with reference to FIGS. 6 through 9.

At 1410, the UE may receive, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI. The operations of 1410 may be performed according to the methods described herein. In some examples, aspects of the operations of 1410 may be performed by a grant manager as described with reference to FIGS. 6 through 9.

At 1415, the UE may determine whether to monitor for the scheduled downlink data transmission based on determining whether the one or more broadcast signals and the reference signal are received within the first TTI. The operations of 1415 may be performed according to the methods described herein. In some examples, aspects of the operations of 1415 may be performed by a data manager as described with reference to FIGS. 6 through 9.

Figure 15:
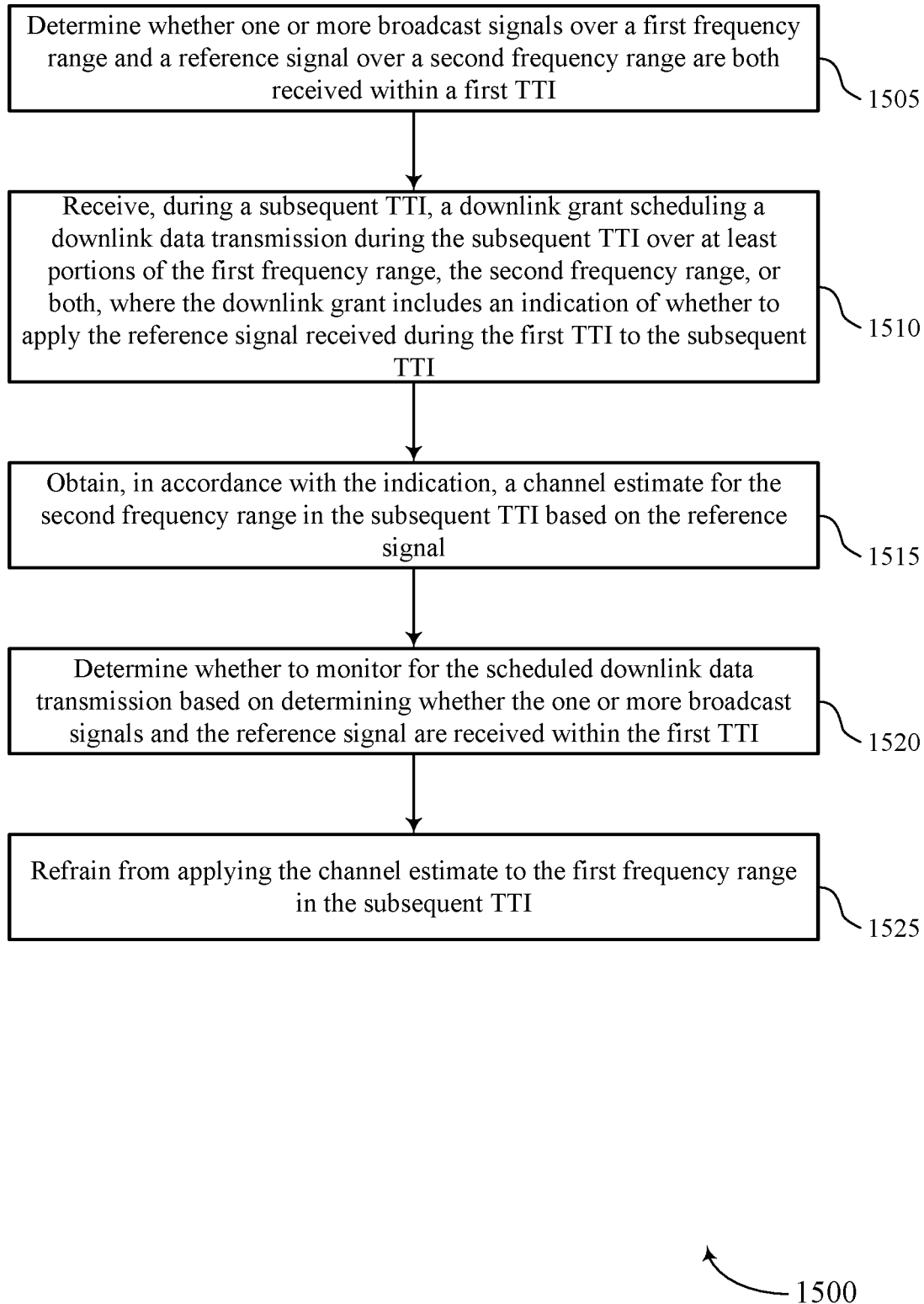

FIG. 15 shows a flowchart illustrating a method 1500 that supports low latency multiplexing operations in accordance with aspects of the present disclosure. The operations of method 1500 may be implemented by a UE 115 or its components as described herein. For example, the operations of method 1500 may be performed by a UE coding manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine whether one or more broadcast signals over a first frequency range and a reference signal over a second frequency range are both received within a first TTI. The operations of 1505 may be performed according to the methods described herein. In some examples, aspects of the operations of 1505 may be performed by a signal collision manager as described with reference to FIGS. 6 through 9.

At 1510, the UE may receive, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI. The operations of 1510 may be performed according to the methods described herein. In some examples, aspects of the operations of 1510 may be performed by a grant manager as described with reference to FIGS. 6 through 9.

At 1515, the UE may obtain, in accordance with the indication, a channel estimate for the second frequency range in the subsequent TTI based on the reference signal. The operations of 1515 may be performed according to the methods described herein. In some examples, aspects of the operations of 1515 may be performed by a channel estimator as described with reference to FIGS. 6 through 9.

At 1520, the UE may determine whether to monitor for the scheduled downlink data transmission based on determining whether the one or more broadcast signals and the reference signal are received within the first TTI. The operations of 1520 may be performed according to the methods described herein. In some examples, aspects of the operations of 1520 may be performed by a data manager as described with reference to FIGS. 6 through 9.

At 1525, the UE may refrain from applying the channel estimate to the first frequency range in the subsequent TTI. The operations of 1525 may be performed according to the methods described herein. In some examples, aspects of the operations of 1525 may be performed by a channel estimate manager as described with reference to FIGS. 6 through 9.

Figure 16:
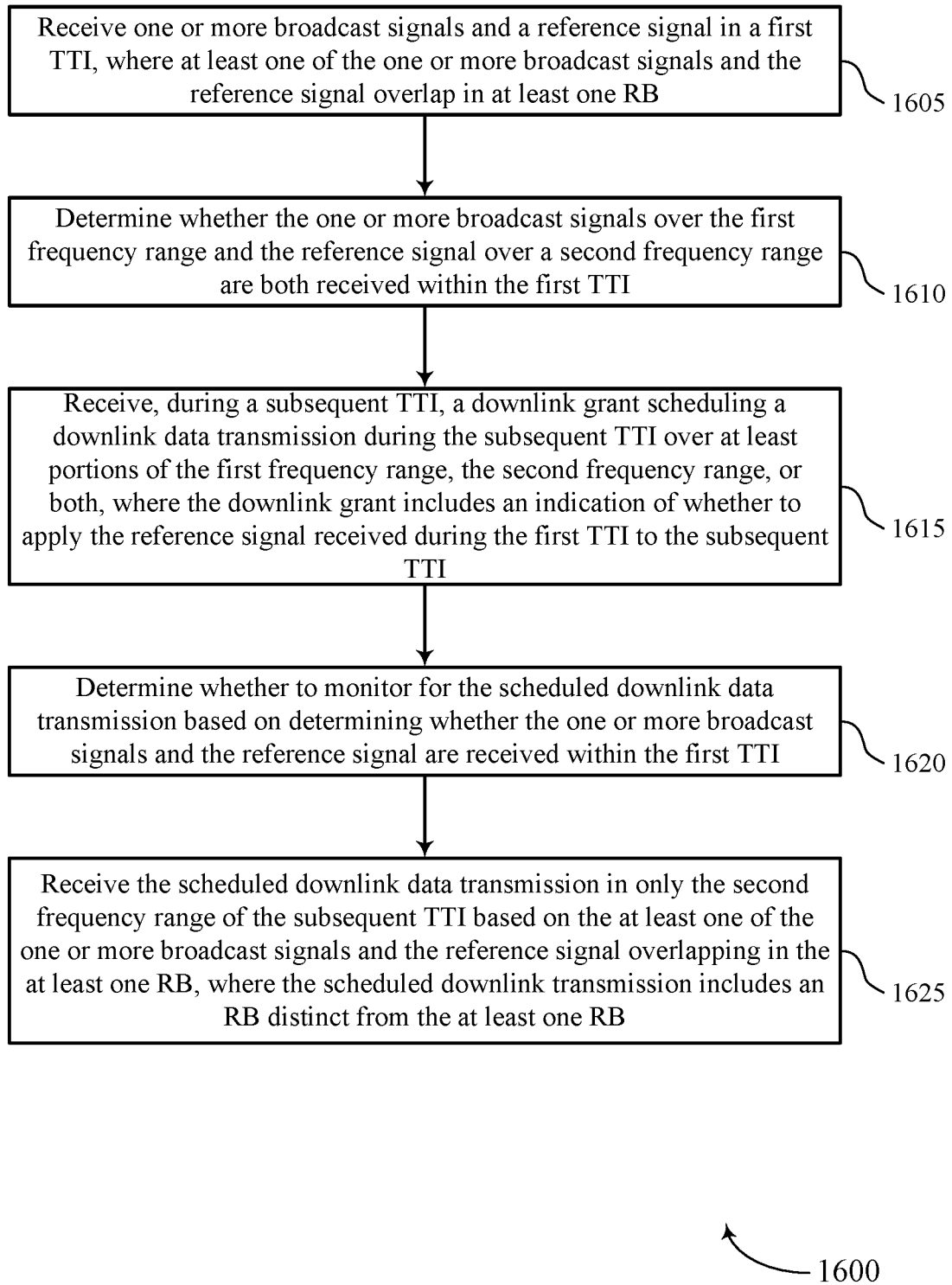

FIG. 16 shows a flowchart illustrating a method 1600 that supports low latency multiplexing operations in accordance with aspects of the present disclosure. The operations of method 1600 may be implemented by a UE 115 or its components as described herein. For example, the operations of method 1600 may be performed by a UE coding manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive one or more broadcast signals and a reference signal in a first TTI, where at least one of the one or more broadcast signals and the reference signal overlap in at least one RB. The operations of 1605 may be performed according to the methods described herein. In some examples, aspects of the operations of 1605 may be performed by a signal reception manager as described with reference to FIGS. 6 through 9.

At 1610, the UE may determine whether the one or more broadcast signals over a first frequency range and the reference signal over a second frequency range are both received within the first TTI. The operations of 1610 may be performed according to the methods described herein. In some examples, aspects of the operations of 1610 may be performed by a signal collision manager as described with reference to FIGS. 6 through 9.

At 1615, the UE may receive, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI. The operations of 1615 may be performed according to the methods described herein. In some examples, aspects of the operations of 1615 may be performed by a grant manager as described with reference to FIGS. 6 through 9.

At 1620, the UE may determine whether to monitor for the scheduled downlink data transmission based on determining whether the one or more broadcast signals and the reference signal are received within the first TTI. The operations of 1620 may be performed according to the methods described herein. In some examples, aspects of the operations of 1620 may be performed by a data manager as described with reference to FIGS. 6 through 9.

At 1625, the UE may receive the scheduled downlink data transmission in only the second frequency range of the subsequent TTI based on the at least one of the one or more broadcast signals and the reference signal overlapping in the at least one RB, where the scheduled downlink transmission includes an RB distinct from the at least one RB. The operations of 1625 may be performed according to the methods described herein. In some examples, aspects of the operations of 1625 may be performed by a signal reception manager as described with reference to FIGS. 6 through 9.

Figure 17:
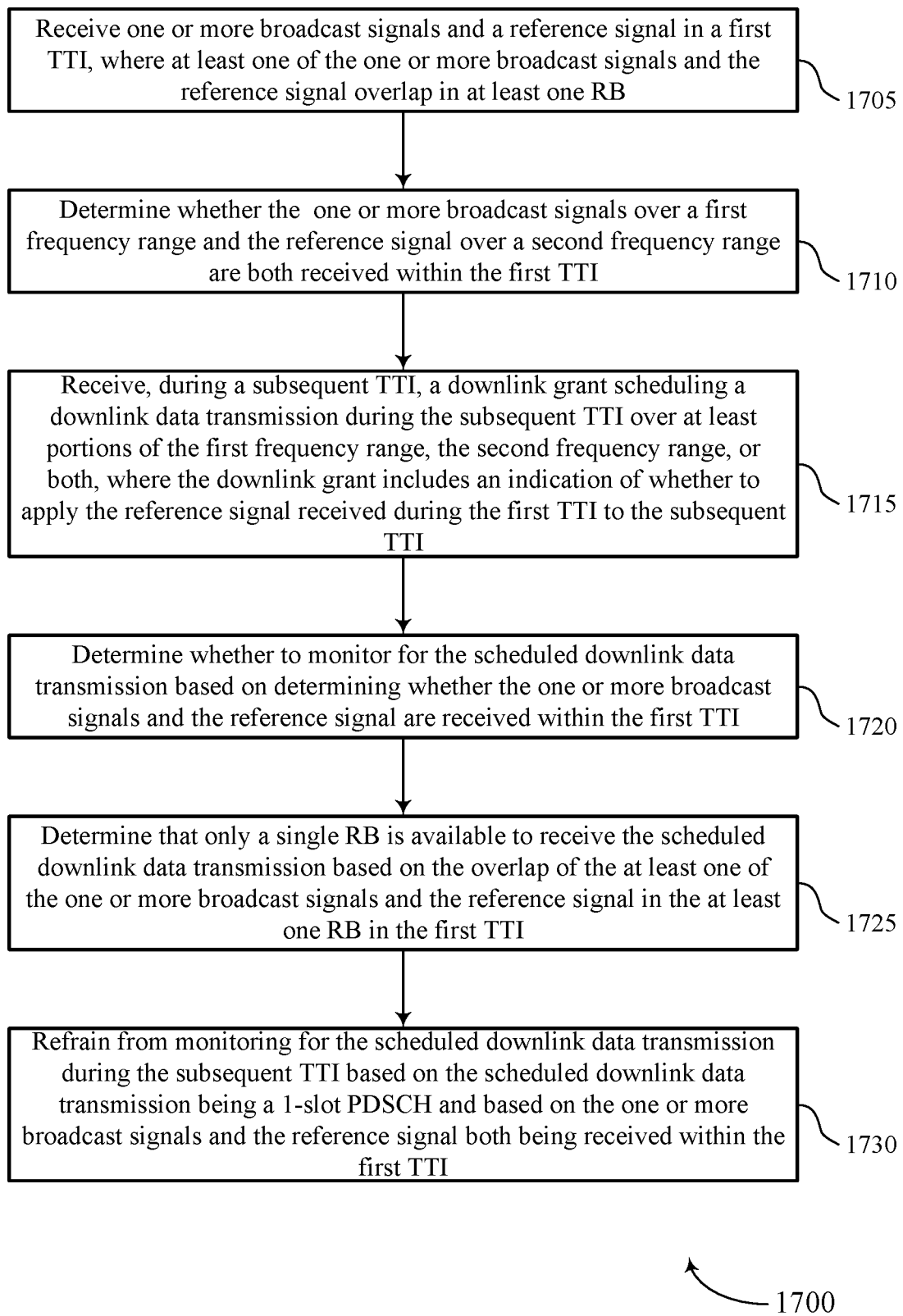

FIG. 17 shows a flowchart illustrating a method 1700 that supports low latency multiplexing operations in accordance with aspects of the present disclosure. The operations of method 1700 may be implemented by a UE 115 or its components as described herein. For example, the operations of method 1700 may be performed by a UE coding manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive one or more broadcast signals and a reference signal in a first TTI, where at least one of the one or more broadcast signals and the reference signal overlap in at least one RB. The operations of 1705 may be performed according to the methods described herein. In some examples, aspects of the operations of 1705 may be performed by a signal reception manager as described with reference to FIGS. 6 through 9.

At 1710, the UE may determine whether the one or more broadcast signals over a first frequency range and the reference signal over a second frequency range are both received within the first TTI. The operations of 1710 may be performed according to the methods described herein. In some examples, aspects of the operations of 1710 may be performed by a signal collision manager as described with reference to FIGS. 6 through 9.

At 1715, the UE may receive, during a subsequent TTI, a downlink grant scheduling a downlink data transmission during the subsequent TTI over at least portions of the first frequency range, the second frequency range, or both, where the downlink grant includes an indication of whether to apply the reference signal received during the first TTI to the subsequent TTI. The operations of 1715 may be performed according to the methods described herein. In some examples, aspects of the operations of 1715 may be performed by a grant manager as described with reference to FIGS. 6 through 9.

At 1720, the UE may determine whether to monitor for the scheduled downlink data transmission based on determining whether the one or more broadcast signals and the reference signal are received within the first TTI. The operations of 1720 may be performed according to the methods described herein. In some examples, aspects of the operations of 1720 may be performed by a data manager as described with reference to FIGS. 6 through 9.

At 1725, the UE may determine that only a single RB is available to receive the scheduled downlink data transmission based on the overlap of the at least one of the one or more broadcast signals and the reference signal in the at least one RB in the first TTI. The operations of 1725 may be performed according to the methods described herein. In some examples, aspects of the operations of 1725 may be performed by a resource block overlap manager as described with reference to FIGS. 6 through 9.

At 1730, the UE may refrain from monitoring for the scheduled downlink data transmission during the subsequent TTI based on the scheduled downlink data transmission being a 1-slot PDSCH and based on the one or more broadcast signals and the reference signal both being received within the first TTI. The operations of 1730 may be performed according to the methods described herein. In some examples, aspects of the operations of 1730 may be performed by a resource block overlap manager as described with reference to FIGS. 6 through 9.

Figure 18:
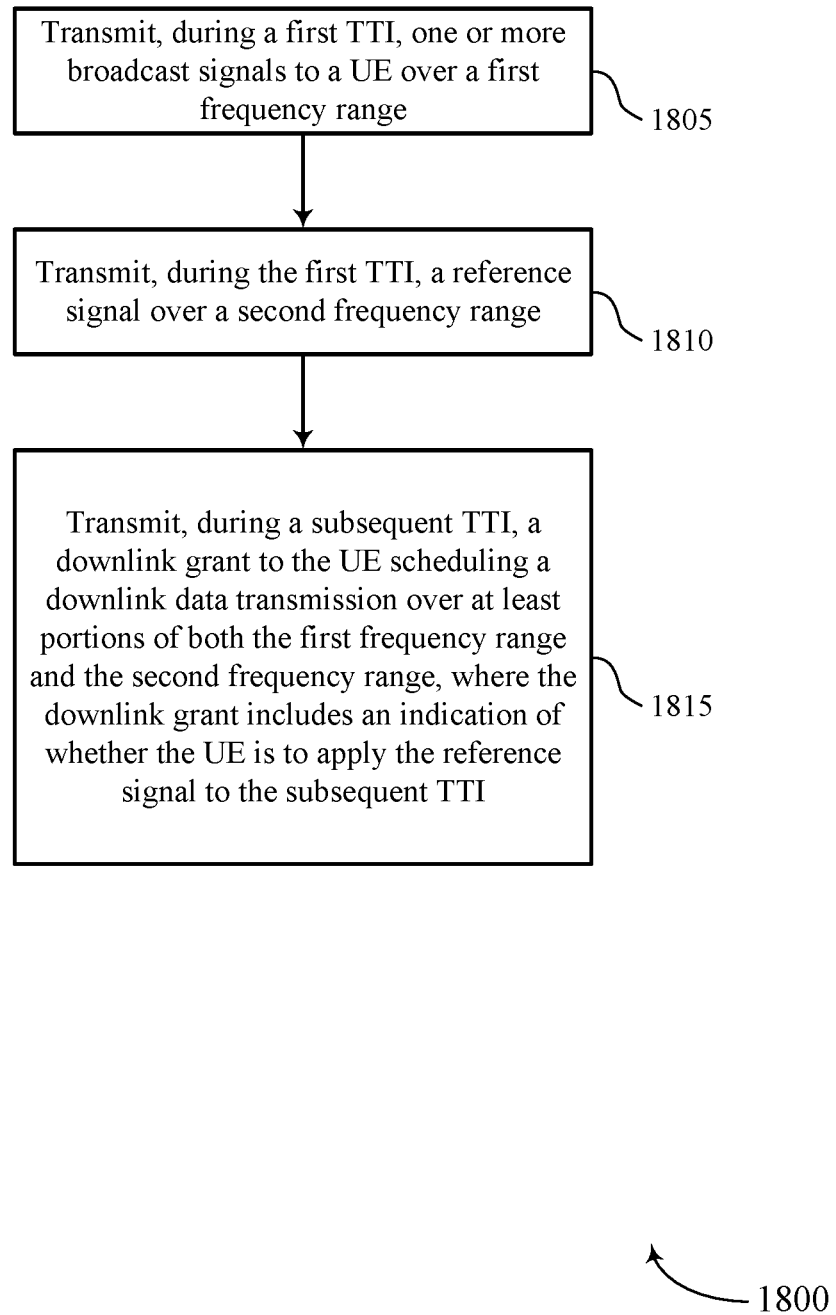

FIG. 18 shows a flowchart illustrating a method 1800 that supports low latency multiplexing operations in accordance with aspects of the present disclosure. The operations of method 1800 may be implemented by a base station 105 or its components as described herein. For example, the operations of method 1800 may be performed by a base station coding manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, during a first TTI, one or more broadcast signals to a UE over a first frequency range. The operations of 1805 may be performed according to the methods described herein. In some examples, aspects of the operations of 1805 may be performed by a broadcast signal transmit module as described with reference to FIGS. 10 through 13.

At 1810, the base station may transmit, during the first TTI, a reference signal over a second frequency range. The operations of 1810 may be performed according to the methods described herein. In some examples, aspects of the operations of 1810 may be performed by a reference signal transmit module as described with reference to FIGS. 10 through 13.

At 1815, the base station may transmit, during a subsequent TTI, a downlink grant to the UE scheduling a downlink data transmission over at least portions of both the first frequency range and the second frequency range, where the downlink grant includes an indication of whether the UE is to apply the reference signal to the subsequent TTI. The operations of 1815 may be performed according to the methods described herein. In some examples, aspects of the operations of 1815 may be performed by a grant transmit module as described with reference to FIGS. 10 through 13.

Figure 19:
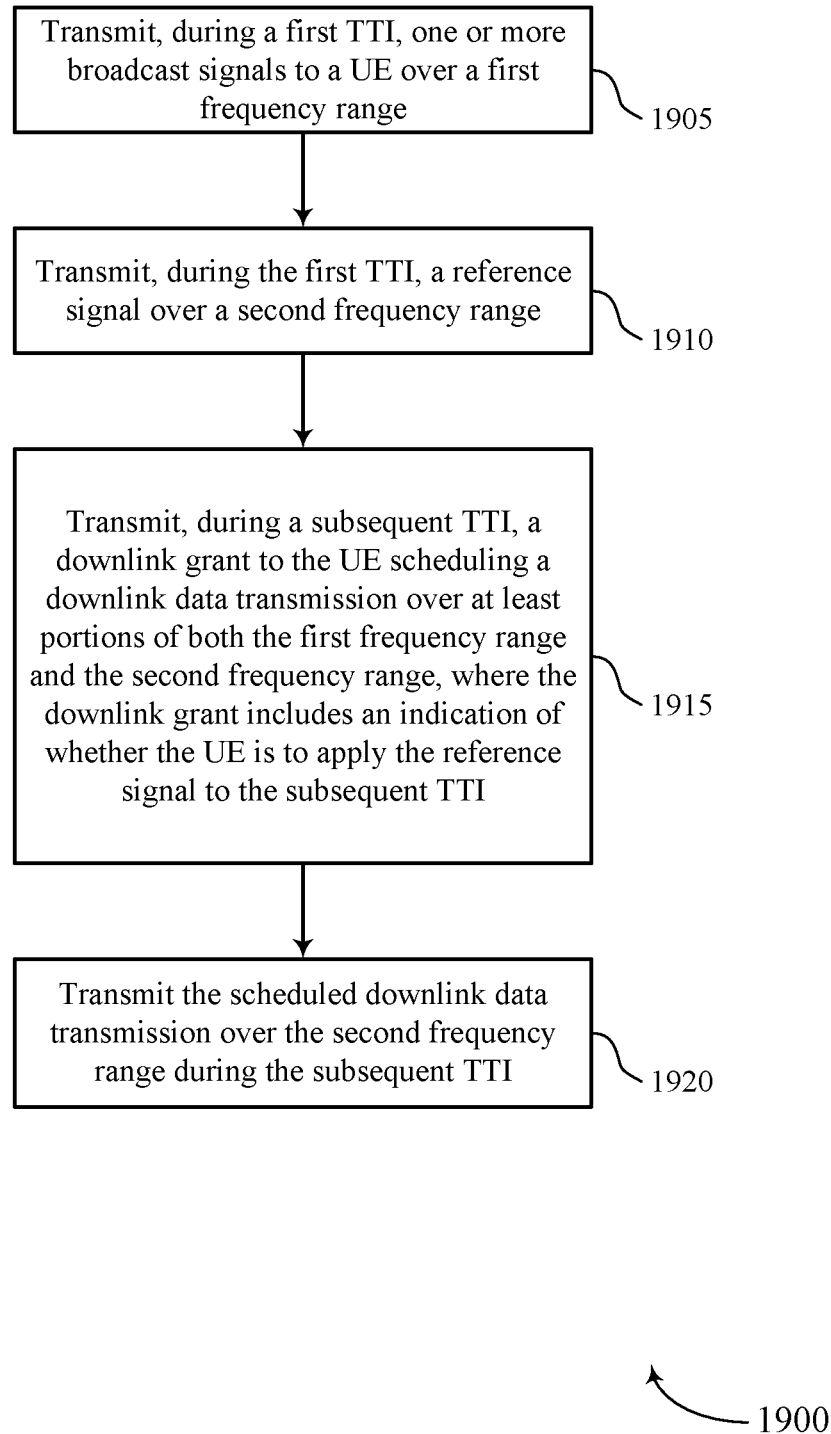

FIG. 19 shows a flowchart illustrating a method 1900 that supports low latency multiplexing operations in accordance with aspects of the present disclosure. The operations of method 1900 may be implemented by a base station 105 or its components as described herein. For example, the operations of method 1900 may be performed by a base station coding manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit, during a first TTI, one or more broadcast signals to a UE over a first frequency range. The operations of 1905 may be performed according to the methods described herein. In some examples, aspects of the operations of 1905 may be performed by a broadcast signal transmit module as described with reference to FIGS. 10 through 13.

At 1910, the base station may transmit, during the first TTI, a reference signal over a second frequency range. The operations of 1910 may be performed according to the methods described herein. In some examples, aspects of the operations of 1910 may be performed by a reference signal transmit module as described with reference to FIGS. 10 through 13.

At 1915, the base station may transmit, during a subsequent TTI, a downlink grant to the UE scheduling a downlink data transmission over at least portions of both the first frequency range and the second frequency range, where the downlink grant includes an indication of whether the UE is to apply the reference signal to the subsequent TTI. The operations of 1915 may be performed according to the methods described herein. In some examples, aspects of the operations of 1915 may be performed by a grant transmit module as described with reference to FIGS. 10 through 13.

At 1920, the base station may transmit the scheduled downlink data transmission over the second frequency range during the subsequent TTI. The operations of 1920 may be performed according to the methods described herein. In some examples, aspects of the operations of 1920 may be performed by a data transmit module as described with reference to FIGS. 10 through 13.

Figure 20:
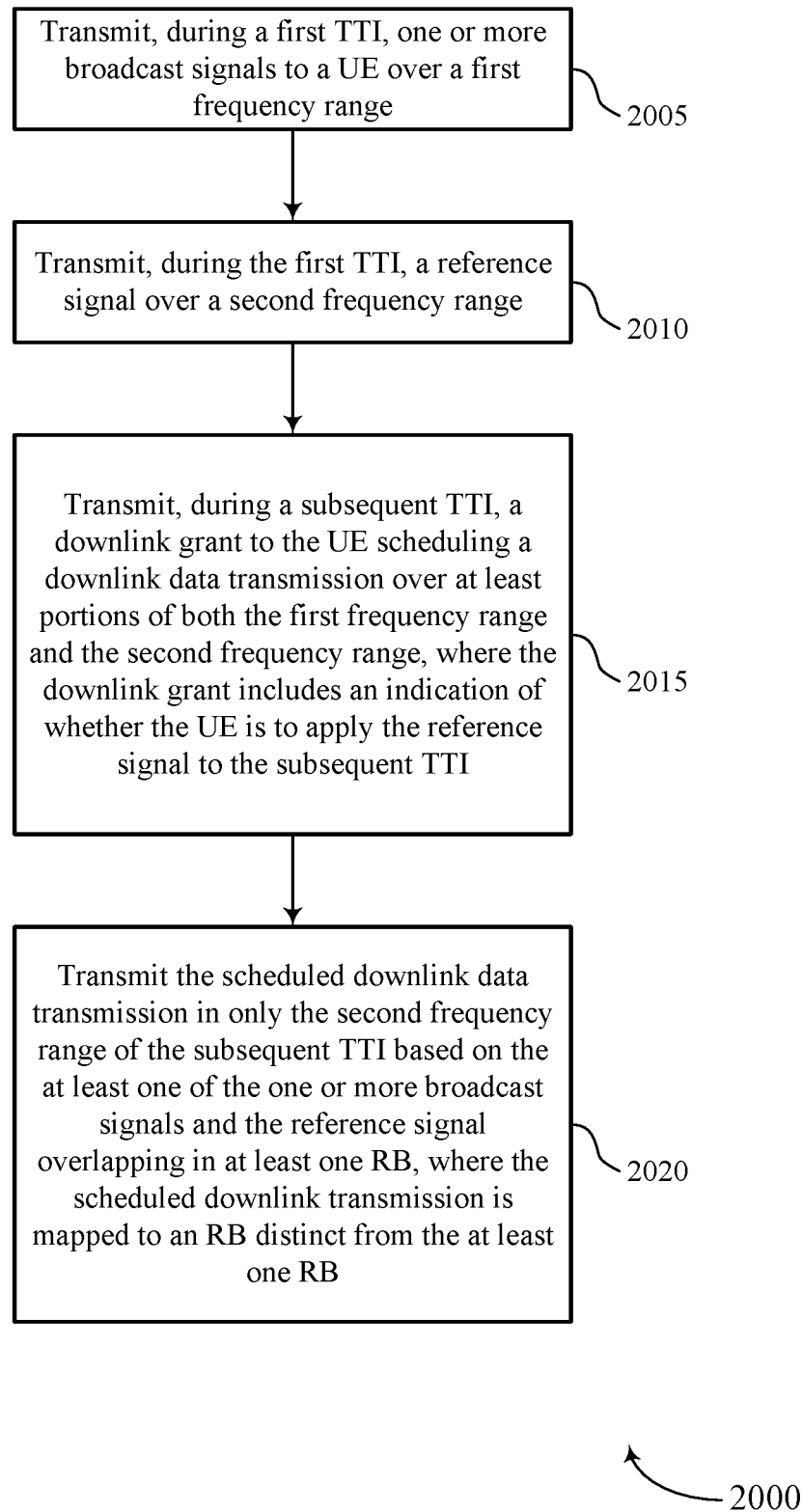

FIG. 20 shows a flowchart illustrating a method 2000 that supports low latency multiplexing operations in accordance with aspects of the present disclosure. The operations of method 2000 may be implemented by a base station 105 or its components as described herein. For example, the operations of method 2000 may be performed by a base station coding manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit, during a first TTI, one or more broadcast signals to a UE over a first frequency range. The operations of 2005 may be performed according to the methods described herein. In some examples, aspects of the operations of 2005 may be performed by a broadcast signal transmit module as described with reference to FIGS. 10 through 13.

At 2010, the base station may transmit, during the first TTI, a reference signal over a second frequency range. The operations of 2010 may be performed according to the methods described herein. In some examples, aspects of the operations of 2010 may be performed by a reference signal transmit module as described with reference to FIGS. 10 through 13.

At 2015, the base station may transmit, during a subsequent TTI, a downlink grant to the UE scheduling a downlink data transmission over at least portions of both the first frequency range and the second frequency range, where the downlink grant includes an indication of whether the UE is to apply the reference signal received to the subsequent TTI. The operations of 2015 may be performed according to the methods described herein. In some examples, aspects of the operations of 2015 may be performed by a grant transmit module as described with reference to FIGS. 10 through 13.

At 2020, the base station may transmit the scheduled downlink data transmission in only the second frequency range of the subsequent TTI based on the at least one of the one or more broadcast signals and the reference signal overlapping in at least one RB, where the scheduled downlink transmission includes an RB distinct from the at least one RB. The operations of 2020 may be performed according to the methods described herein. In some examples, aspects of the operations of 2020 may be performed by a data transmit module as described with reference to FIGS. 10 through 13.

Figure 21:
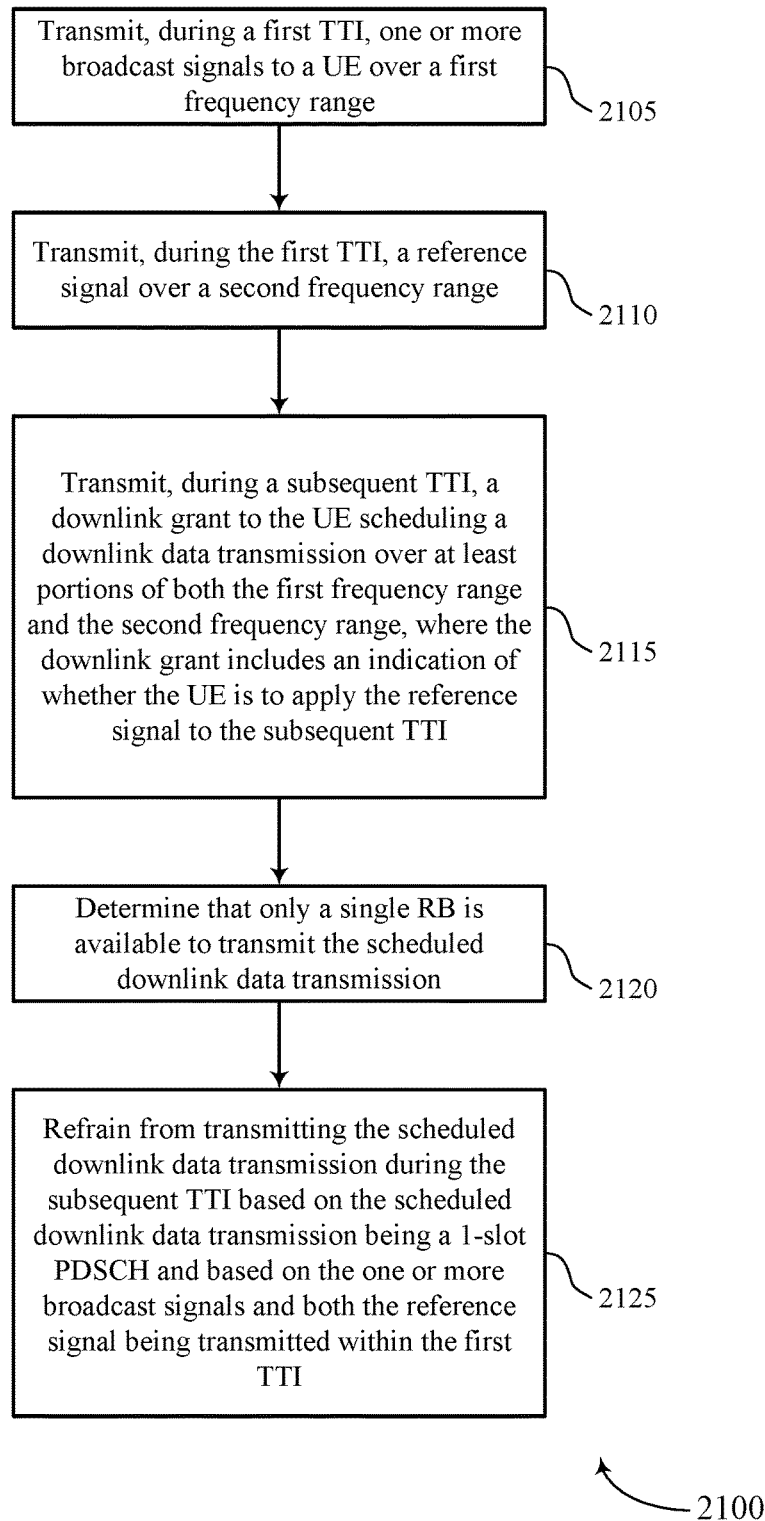

FIG. 21 shows a flowchart illustrating a method 2100 that supports low latency multiplexing operations in accordance with aspects of the present disclosure. The operations of method 2100 may be implemented by a base station 105 or its components as described herein. For example, the operations of method 2100 may be performed by a Base Station Coding Manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may transmit, during a first TTI, one or more broadcast signals to a UE over a first frequency range. The operations of 2105 may be performed according to the methods described herein. In some examples, aspects of the operations of 2105 may be performed by a broadcast signal transmit module as described with reference to FIGS. 10 through 13.

At 2110, the base station may transmit, during the first TTI, a reference signal over a second frequency range. The operations of 2110 may be performed according to the methods described herein. In some examples, aspects of the operations of 2110 may be performed by a reference signal transmit module as described with reference to FIGS. 10 through 13.

At 2115, the base station may transmit, during a subsequent TTI, a downlink grant to the UE scheduling a downlink data transmission over at least portions of both the first frequency range and the second frequency range, where the downlink grant includes an indication of whether the UE is to apply the reference signal to the subsequent TTI. The operations of 2115 may be performed according to the methods described herein. In some examples, aspects of the operations of 2115 may be performed by a grant transmit module as described with reference to FIGS. 10 through 13.

At 2120, the base station may determine that only a single RB is available to transmit the scheduled downlink data transmission. The operations of 2120 may be performed according to the methods described herein. In some examples, aspects of the operations of 2120 may be performed by a resource block availability manager as described with reference to FIGS. 10 through 13.

At 2125, the base station may refrain from transmitting the scheduled downlink data transmission during the subsequent TTI based on the scheduled downlink data transmission being a 1-slot PDSCH and based on the one or more broadcast signals and the reference signal both being transmitted within the first TTI. The operations of 2125 may be performed according to the methods described herein. In some examples, aspects of the operations of 2125 may be performed by a resource block availability manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining whether one or more broadcast signals over a first frequency range and a reference signal over a second frequency range are both received within a first transmission time interval (TTI);
   receiving, during a subsequent TTI, a downlink grant scheduling a downlink data transmission during the subsequent TTI over at least portions of the first frequency range, the second frequency range, or both, wherein the downlink grant comprises an indication of whether to apply the reference signal received during the first TTI to the subsequent TTI; and
   determining whether to monitor for the scheduled downlink data transmission based at least in part on determining whether the one or more broadcast signals and the reference signal are received within the first TTI.

2. The method of claim 1, wherein determining whether to monitor for the scheduled downlink data transmission further comprises:
   determining to monitor for the scheduled downlink data transmission rate-matched around the first frequency range in the subsequent TTI based at least in part on the one or more broadcast signals and the reference signal both being received within the first TTI.

3. The method of claim 1, wherein determining whether to monitor for the scheduled downlink data transmission further comprises:
   determining to decode the scheduled downlink data transmission without rate-matching based at least in part on the one or more broadcast signals and the reference signal not being received within the same TTI.

4. The method of claim 1, wherein the second frequency range is disjoint from the first frequency range.

5. The method of claim 4, further comprising:
obtaining, in accordance with the indication, a channel estimate for the second frequency range in the subsequent TTI based at least in part on the reference signal; and
refraining from applying the channel estimate to the first frequency range in the subsequent TTI.

6. The method of claim 5, further comprising:
receiving the scheduled downlink data transmission during the subsequent TTI based at least in part on the channel estimate.

7. The method of claim 6, wherein receiving the scheduled downlink data transmission comprises:
receiving the scheduled downlink data transmission rate-matched around the first frequency range in the subsequent TTI.

8. The method of claim 1, wherein the one or more broadcast signals are transmitted within a subframe whose duration is longer than and overlaps with the first TTI and the subsequent TTI.

9. The method of claim 1, wherein the first TTI and the subsequent TTI comprise temporally adjacent TTIs.

10. The method of claim 1, wherein the one or more broadcast signals comprises a primary synchronization signal (PSS), a secondary synchronization signal (SSS), a physical broadcast channel (PBCH), or a combination thereof.

11. The method of claim 1, further comprising:
receiving the one or more broadcast signals and a downlink data transmission in the first TTI, wherein at least one of the one or more broadcast signals and the downlink data transmission overlap in at least one resource block (RB), and wherein the downlink data transmission comprises 1-slot physical downlink shared channel (PDSCH).

12. The method of claim 1, further comprising:
receiving the one or more broadcast signals and the reference signal in the first TTI, wherein at least one of the one or more broadcast signals and the reference signal overlap in at least one resource block (RB).

13. The method of claim 12, further comprising:
receiving the scheduled downlink data transmission in only the second frequency range of the subsequent TTI based at least in part on the at least one of the one or more broadcast signals and the reference signal overlapping in the at least one RB, wherein the scheduled downlink transmission comprises an RB distinct from the at least one RB.

14. The method of claim 13, wherein the scheduled downlink data transmission comprises a 1-slot physical downlink shared channel (PDSCH) and the one or more broadcast signals comprise a physical broadcast channel (PBCH).

15. The method of claim 12, further comprising:
determining that only a single RB is available to receive the scheduled downlink data transmission based at least in part on the overlap of the at least one of the one or more broadcast signals and the reference signal in the at least one RB in the first TTI; and
refraining from monitoring for the scheduled downlink data transmission during the subsequent TTI based at least in part on the scheduled downlink data transmission being a 1-slot physical downlink shared channel (PDSCH) and based on the one or more broadcast signals and the reference signal both being received within the first TTI.

16. The method of claim 15, wherein the one or more broadcast signals include at least one of a primary synchronization signal (PSS), a secondary synchronization signal (SSS), a physical broadcast channel (PBCH), or combinations thereof.

17. The method of claim 15, wherein the single RB is available within a precoding resource block group (PRG).

18. A method for wireless communication at a base station, comprising:
transmitting, during a first transmission time interval (TTI), one or more broadcast signals to a user equipment (UE) over a first frequency range;
transmitting, during the first TTI, a reference signal over a second frequency range; and
transmitting, during a subsequent TTI, a downlink grant to the UE scheduling a downlink data transmission over at least portions of both the first frequency range and the second frequency range, wherein the downlink grant comprises an indication of whether the UE is to apply the reference signal to the subsequent TTI.

19. The method of claim 18, further comprising:
transmitting the scheduled downlink data transmission over the second frequency range during the subsequent TTI.

20. The method of claim 19, wherein transmitting the scheduled downlink data transmission comprises:
transmitting the scheduled downlink data transmission rate-matched around the first frequency range in the subsequent TTI.

21. The method of claim 18, wherein the one or more broadcast signals are transmitted within a subframe whose duration is longer than and overlaps with the first TTI and the subsequent TTI.

22. The method of claim 18, wherein the first TTI and the subsequent TTI comprise temporally adjacent TTIs.

23. The method of claim 18, wherein the one or more broadcast signals comprise a primary synchronization signal (PSS), a secondary synchronization signal (SSS), a physical broadcast channel (PBCH), or a combination thereof.

24. The method of claim 18, further comprising:
transmitting the scheduled downlink data transmission in only the second frequency range of the subsequent TTI based at least in part on the at least one of the one or more broadcast signals and the reference signal overlapping in at least one RB, wherein the scheduled downlink transmission comprises an RB distinct from the at least one RB.

25. The method of claim 24, wherein the scheduled downlink data transmission comprises a 1-slot physical downlink shared channel (PDSCH) and the one or more broadcast signals comprise a physical broadcast channel (PBCH).

26. An apparatus for wireless communication comprising:
a processor,
memory in electronic communication with the processor; and
instructions stored in the memory and executable by the processor to causes the apparatus to:
determine whether one or more broadcast signals in over a first frequency range and a reference signal over a second frequency range that is disjoint from the first frequency range are both received within a first transmission time interval (TTI);
receive, during a subsequent TTI, a downlink grant scheduling a downlink data transmission during the subsequent TTI over at least portions of the first frequency range, the second frequency range, or both, wherein the downlink grant comprises an indication of whether to apply the reference signal received during the first TTI to the subsequent TTI; and determine whether to monitor for the scheduled downlink data transmission based at least in part on determining whether the one or more broadcast signals and the reference signal are received within the first TTI.

27. The apparatus of claim 26, wherein the instructions to determine whether to monitor for the scheduled downlink data transmission are executable by the processor to cause the apparatus to:

determine to monitor for the scheduled downlink data transmission based at least in part on the one or more broadcast signals and the reference signal both being received within the first TTI.

28. The apparatus of claim 26, wherein the instructions to determine whether to monitor for the scheduled downlink data transmission are executable by the processor to cause the apparatus to:

determine to decode the scheduled downlink data transmission without rate-matching based at least in part on the one or more broadcast signals and the reference signal not being received within the same TTI.

29. An apparatus for wireless communication comprising:
a processor,
memory in electronic communication with the processor; and
instructions stored in the memory and executable by the processor to causes the apparatus to:
  transmit, during a first transmission time interval (TTI), one or more broadcast signals to a user equipment (UE) in a first set of resource blocks (RBs) over a first frequency range;
  transmit, during the first TTI, a reference signal in a second set of RBs over a second frequency range that is disjoint from the first frequency range; and
  transmit, during a subsequent TTI, a downlink grant to the UE scheduling a downlink data transmission over at least portions of both the first frequency range and the second frequency range, wherein the downlink grant comprises an indication of whether the UE is to apply the reference signal to the subsequent TTI.

30. The apparatus of claim 29, wherein the instructions are further executable by the processor to cause the apparatus to:

transmit the scheduled downlink data transmission over the second frequency range during the subsequent TTI.

* * * * *